United States Patent
Savelli et al.

(10) Patent No.: US 10,049,371 B2
(45) Date of Patent: Aug. 14, 2018

(54) SYSTEM AND APPARATUS FOR ASSESSING REACH, ENGAGEMENT, CONVERSATION OR OTHER SOCIAL METRICS BASED ON DOMAIN TAILORED EVALUATION OF SOCIAL MEDIA EXPOSURE

(71) Applicant: MVPindex Inc., Dallas, TX (US)

(72) Inventors: Victor Vincent Savelli, Dallas, TX (US); Shawn Timothy Spieth, Dallas, TX (US); Kyle Allen Nelson, Dallas, TX (US); Powell McVay Kinney, Dallas, TX (US); Eric Jonathan Swayne, Denton, TX (US)

(73) Assignee: MVPINDEX, INC., Dallas, TX (US)

( * ) Notice: Subject to any disclaimer, the term of this patent is extended or adjusted under 35 U.S.C. 154(b) by 848 days.

(21) Appl. No.: 14/498,840

(22) Filed: Sep. 26, 2014

(65) Prior Publication Data
US 2015/0095108 A1   Apr. 2, 2015

Related U.S. Application Data

(60) Provisional application No. 61/883,801, filed on Sep. 27, 2013.

(51) Int. Cl.
*G06Q 30/02* (2012.01)
*H04L 29/08* (2006.01)
(Continued)

(52) U.S. Cl.
CPC ..... *G06Q 30/0201* (2013.01); *G06F 17/3053* (2013.01); *G06Q 30/0242* (2013.01);
(Continued)

(58) Field of Classification Search
None
See application file for complete search history.

(56) References Cited

U.S. PATENT DOCUMENTS 5,842,196 A    11/1998 Agarwal et al.
8,285,700 B2   10/2012 Steelberg et al.
(Continued)

OTHER PUBLICATIONS

International Search Report and Written Opinion of the International Searching Authority for International Application No. PCT/US14/057875, dated Dec. 30, 2014, 12 pgs.
(Continued)

*Primary Examiner* — Susanna M. Diaz
(74) *Attorney, Agent, or Firm* — Sprinkle IP Law Group

(57) ABSTRACT

Embodiments described herein provide a social media analytics platform. An entity may be configured with respect to the platform and a number of social media accounts, and other data such as aliases or search terms associated with the entity. Data is collected at certain intervals from the various online sites, including social media sites, using the various disparate and proprietary interfaces and data models provided by the sites and the configurations for the social media accounts associated with an entity. Using this data obtained from these online sites one or more scores can be calculated or update based on the data, where the score(s) may serve to quantify a facet of the entity's social media exposure and may serve to be domain specific to the entity. The scores for each of the indices for an entity can thus serve to quantify facets of an entity's social media exposure.

16 Claims, 20 Drawing Sheets

(51) Int. Cl.
*G06Q 50/00* (2012.01)
*G06F 17/30* (2006.01)

(52) U.S. Cl.
CPC ............ *G06Q 50/01* (2013.01); *H04L 67/22* (2013.01); *H04L 67/306* (2013.01)

(56) References Cited

U.S. PATENT DOCUMENTS

| | | | |
|---|---|---|---|
| 8,504,616 B1 | 8/2013 | Whitney et al. | |
| 8,943,039 B1* | 1/2015 | Grieselhuber | G06F 17/3089 707/709 |
| 2010/0262592 A1 | 10/2010 | Brawer et al. | |
| 2012/0131013 A1 | 5/2012 | Hobbs et al. | |
| 2012/0272134 A1* | 10/2012 | Steelberg | G06Q 30/02 715/234 |
| 2012/0317227 A1 | 12/2012 | Bettinger | |
| 2013/0035982 A1* | 2/2013 | Zhang | G06Q 30/02 705/7.29 |
| 2013/0166648 A1* | 6/2013 | Allard | G06Q 30/0242 709/204 |
| 2013/0173368 A1* | 7/2013 | Boutin | G06F 17/30283 705/14.16 |
| 2013/0204940 A1 | 8/2013 | Kinsel et al. | |
| 2013/0246215 A1 | 9/2013 | Faith et al. | |
| 2013/0325550 A1* | 12/2013 | Varghese | G06Q 30/02 705/7.31 |
| 2013/0339109 A1* | 12/2013 | Steelberg | G06Q 30/0207 705/14.1 |
| 2014/0095598 A1* | 4/2014 | Schornack | G06Q 10/101 709/204 |
| 2014/0122622 A1* | 5/2014 | Castera | H04L 51/32 709/206 |
| 2014/0156372 A1* | 6/2014 | Postrel | G06Q 30/0226 705/14.27 |
| 2015/0066948 A1* | 3/2015 | Carlton | G06F 15/17306 707/748 |
| 2015/0095137 A1 | 4/2015 | Savelli et al. | |

OTHER PUBLICATIONS

Becker Hila, et al., Learning Similarity Metrics for Event Identification in Social Media, WSDM' 10, Feb. 2010, New York, NY, retrieved on Jan. 12, 2014, from <http://www.cs.columbia.edu/~gravano/Papers/2010/wsdm10.pdf>, 10 pgs.
Doerr, Christian, et al., "Metric Convergence in Social Network Sampling," HotPlanet, Proceedings of the 5th ACM workshop on HotPlanet, Aug. 16, 2013, retrieved from <http://conferences.sigcomm.org/sigcomm/2013/papers/hotplanet/p45.pdf>, pp. 45-50.
International Search Report and Written Opinion of the International Searching Authority for International Application No. PCT/US14/057874, dated Dec. 30, 2014, 10 pgs.
Yang, Yang et al. "SAE: Social Analytic Engine for Large Networks", KDD'13, Aug. 11-14, 2013, Chicago, IL, retrieved from <http://web.engr.illinois.edu/~hzhuang3/files/KDD13-Yang-et-al-Social-Analytic-Engine.pdf>, 4 pgs.
International Preliminary Report on Patentability with Written Opinion for International Patent Application No. PCT/US2014/057875, dated Mar. 29, 2016, 10 pgs.
International Preliminary Report on Patentability with Written Opinion for International Patent Application No. PCT/US2014/057874, dated Mar. 29, 2016, 8 pgs.
European Search Report issued for European Patent Application No. 14 8472 28.5, dated May 4, 2017, 8 pages.
Office Action issued for U.S. Appl. No. 14/498,860, dated Oct. 4, 2017, 24 pages.
Communication from the European Patent Office issued for European Patent Application No. 14847228.5, dated Dec. 12, 2017, 11 pages.
Office Action issued for Australian Patent Application No. 2014324654, dated Apr. 19, 2018, 4 pages.
Office Action issued for U.S. Appl. No. 14/498,860, dated Jun. 12, 2018, 19 pages.

* cited by examiner

FIG. 8A

| | | ASP Surfing (Mens) | ASP Surfing (Womens) | Baseball (MLB) | Basketball (NBA) | Basketball (WNBA) |
|---|---|---|---|---|---|---|
| | tweets | 0.52 | 0.52 | 0.62 | 1.96 | 0.59 |
| | followers | 1.49 | 1.49 | 0.52 | 2.78 | 0.99 |
| | following | 0.38 | 0.38 | 0.98 | 1.55 | 0.31 |
| | mention_rate | 1.63 | 1.63 | 0.73 | 2.28 | 1.35 |
| | retweet_rate | 1.49 | 1.49 | 0.99 | 2.57 | 0.93 |
| | activities | 0.657 | 0.657 | 0.001 | 0.044 | 0.044 |
| | plus_ones | 0.783 | 0.783 | 0.001 | 0.079 | 0.079 |
| | shares | 0.771 | 0.771 | 0.001 | 0.071 | 0.071 |
| | replies | 0.647 | 0.647 | 0.001 | 0.184 | 0.184 |
| | photos | 0.66 | 0.66 | 0.34 | 1.67 | 1.67 |
| | followers | 0.11 | 0.11 | 0.51 | 5.25 | 5.25 |
| | following | 0.24 | 0.24 | 0.75 | 1.99 | 2.0 |
| | likes | 1.59 | 1.59 | 1.03 | 2.99 | 0.28 |
| | talking_about | 1.77 | 1.77 | 0.57 | 1.48 | 0.15 |
| | post_rate | 1.24 | 1.24 | 0.62 | 0.78 | 0.7 |
| | comment_rate | 1.15 | 1.15 | 0.52 | 0.78 | 0.33 |
| | post_like_rate | 2.16 | 2.16 | 0.53 | 0.78 | 0.1 |
| | share_rate | 1.83 | 1.83 | 0.31 | 0.65 | 0.09 |
| | videos | 0.001 | 0.001 | 0.086 | 0.123 | 0.001 |
| | views | 0.002 | 0.002 | 0.086 | 0.394 | 0.002 |
| | subscribers | 0.006 | 0.006 | 0.044 | 0.778 | 0.006 |
| | interactions | 0.005 | 0.005 | 0.146 | 0.612 | 0.005 |
| | charity | 0.1 | 0.1 | 0.1 | 0.1 | 0.1 |
| | giving_back | 1.0 | 1.0 | 1.0 | 1.0 | 1.0 |
| | foundation | 1.0 | 1.0 | 1.0 | 1.0 | 1.0 |
| | fan_reaction_positive | 1.0 | 1.0 | 1.0 | 1.0 | 1.0 |
| | peds | 0.7 | 0.7 | 0.7 | 0.7 | 0.7 |
| | cheating | 0.0 | 0.0 | 0.0 | 0.0 | 0.0 |
| | legal_issues | 0.2 | 0.2 | 0.2 | 0.2 | 0.2 |
| | arrest | 1.0 | 1.0 | 1.0 | 1.0 | 1.0 |
| | fan_reaction_negative | 1.0 | 1.0 | 1.0 | 1.0 | 1.0 |
| | all | 1.0 | 1.0 | 1.0 | 1.0 | 1.0 |
| | Reach | 1.0 | 1.0 | 1.0 | 1.0 | 1.0 |
| | Engagement | 1.0 | 1.0 | 1.0 | 1.0 | 1.0 |
| | Sponsorability | 1.0 | 1.0 | 1.0 | 1.0 | 1.0 |

| Beach Volleyball (AVP) | BMX | External Entities | Football (NFL) | Formula 1 | Freeskiing | Golf (Champions) |
|---|---|---|---|---|---|---|
| 1.74 | 1.7 | 1.0 | 1.74 | 1.7 | 0.0 | 0.66 |
| 0.4 | 2.78 | 1.0 | 0.4 | 1.52 | 0.0 | 0.69 |
| 1.27 | 1.55 | 1.0 | 1.27 | 1.24 | 0.0 | 2.2 |
| 0.22 | 2.28 | 1.0 | 0.22 | 1.86 | 0.0 | 0.3 |
| 0.33 | 2.57 | 1.0 | 0.33 | 1.55 | 0.0 | 0.26 |
| 0.011 | 0.001 | 0.1 | 0.035 | 0.22 | 0.0 | 0.011 |
| 0.025 | 0.001 | 0.1 | 0.01 | 0.097 | 0.0 | 0.025 |
| 0.057 | 0.001 | 0.1 | 0.007 | 0.086 | 0.0 | 0.057 |
| 0.034 | 0.001 | 0.1 | 0.03 | 0.101 | 0.0 | 0.034 |
| 1.67 | 0.66 | 1.0 | 1.45 | 0.83 | 0.0 | 0.73 |
| 5.25 | 0.11 | 1.0 | 0.75 | 1.01 | 0.0 | 0.51 |
| 1.99 | 0.24 | 1.0 | 2.11 | 0.49 | 0.0 | 0.36 |
| 2.99 | 0.78 | 1.0 | 0.47 | 0.78 | 0.0 | 0.28 |
| 1.48 | 1.89 | 1.0 | 0.34 | 1.89 | 0.0 | 0.15 |
| 0.78 | 3.41 | 1.0 | 0.47 | 3.41 | 0.0 | 0.7 |
| 0.78 | 4.12 | 1.0 | 0.36 | 4.12 | 0.0 | 0.33 |
| 0.78 | 2.62 | 1.0 | 0.25 | 2.62 | 0.0 | 0.1 |
| 0.65 | 4.04 | 1.0 | 0.27 | 4.04 | 0.0 | 0.1 |
| 0.038 | 0.001 | 0.5 | 0.074 | 0.412 | 0.0 | 0.111 |
| 0.012 | 0.002 | 0.5 | 0.08 | 0.113 | 0.0 | 0.492 |
| 0.024 | 0.006 | 0.5 | 0.083 | 0.112 | 0.0 | 0.162 |
| 0.008 | 0.005 | 0.5 | 0.074 | 0.074 | 0.0 | 0.304 |
| 0.1 | 0.1 | 0.1 | 0.1 | 0.1 | 0.0 | 0.1 |
| 1.0 | 1.0 | 1.0 | 1.0 | 1.0 | 0.0 | 1.0 |
| 1.0 | 1.0 | 1.0 | 1.0 | 1.0 | 0.0 | 1.0 |
| 1.0 | 1.0 | 1.0 | 1.0 | 1.0 | 0.0 | 1.0 |
| 0.7 | 0.7 | 0.7 | 0.7 | 0.7 | 0.0 | 0.7 |
| 0.0 | 0.0 | 0.0 | 0.0 | 0.0 | 0.0 | 0.0 |
| 0.2 | 0.2 | 0.2 | 0.2 | 0.2 | 0.0 | 0.2 |
| 1.0 | 1.0 | 1.0 | 1.0 | 1.0 | 0.0 | 1.0 |
| 1.0 | 1.0 | 1.0 | 1.0 | 1.0 | 0.0 | 1.0 |
| 1.0 | 1.0 | 1.0 | 1.0 | 1.0 | 0.0 | 1.0 |
| 1.0 | 1.0 | 1.0 | 1.0 | 1.0 | 1.0 | 1.0 |
| 1.0 | 1.0 | 1.0 | 1.0 | 1.0 | 1.0 | 1.0 |
| 1.0 | 1.0 | 1.0 | 1.0 | 1.0 | 1.0 | 1.0 |

| Golf (European Tour) | Golf (LPGA) | Golf (PGA Tour) | Golf (Web.com) | Hockey (NHL) | Motocross | NBA Draft | NFL Draft |
|---|---|---|---|---|---|---|---|
| 0.62 | 0.91 | 0.66 | 0.66 | 0.29 | 1.96 | 1.74 | 1.74 |
| 0.52 | 0.1 | 0.69 | 0.69 | 0.51 | 2.78 | 0.4 | 0.4 |
| 0.98 | 0.61 | 2.2 | 2.2 | 0.46 | 1.55 | 1.27 | 1.27 |
| 0.73 | 0.09 | 0.3 | 0.3 | 0.55 | 2.28 | 0.22 | 0.22 |
| 0.99 | 0.03 | 0.26 | 0.26 | 0.85 | 2.57 | 0.33 | 0.33 |
| 0.657 | 0.001 | 0.011 | 0.011 | 0.004 | 0.035 | 0.035 | 0.035 |
| 0.783 | 0.001 | 0.025 | 0.025 | 0.001 | 0.01 | 0.01 | 0.01 |
| 0.771 | 0.001 | 0.057 | 0.057 | 0.001 | 0.007 | 0.007 | 0.007 |
| 0.647 | 0.001 | 0.034 | 0.034 | 0.001 | 0.03 | 0.03 | 0.03 |
| 0.73 | 1.02 | 0.73 | 0.73 | 0.35 | 0.66 | 1.45 | 1.45 |
| 0.51 | 0.07 | 0.51 | 0.51 | 0.48 | 0.11 | 0.75 | 0.75 |
| 0.36 | 0.74 | 0.36 | 0.36 | 0.51 | 0.24 | 2.11 | 2.11 |
| 0.47 | 0.05 | 0.28 | 0.28 | 0.19 | 0.19 | 0.47 | 0.47 |
| 0.34 | 0.12 | 0.15 | 0.15 | 0.1 | 0.1 | 0.34 | 0.34 |
| 0.47 | 0.7 | 0.7 | 0.7 | 0.23 | 0.23 | 0.47 | 0.47 |
| 0.36 | 0.19 | 0.33 | 0.33 | 0.34 | 0.34 | 0.36 | 0.36 |
| 0.25 | 0.17 | 0.1 | 0.1 | 0.15 | 0.15 | 0.25 | 0.25 |
| 0.27 | 0.02 | 0.09 | 0.09 | 0.26 | 0.26 | 0.27 | 0.27 |
| 0.086 | 0.001 | 0.111 | 0.111 | 0.038 | 0.038 | 0.074 | 0.074 |
| 0.086 | 0.001 | 0.492 | 0.492 | 0.012 | 0.012 | 0.08 | 0.08 |
| 0.044 | 0.001 | 0.162 | 0.162 | 0.024 | 0.024 | 0.083 | 0.083 |
| 0.146 | 0.001 | 0.304 | 0.304 | 0.008 | 0.008 | 0.074 | 0.074 |
| 0.1 | 0.1 | 0.1 | 0.1 | 0.1 | 0.1 | 0.1 | 0.1 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 0.7 | 0.7 | 0.7 | 0.7 | 0.7 | 0.7 | 0.7 | 0.7 |
| 0.0 | 0.0 | 0.0 | 0.0 | 0.0 | 0.0 | 0.0 | 0.0 |
| 0.2 | 0.2 | 0.2 | 0.2 | 0.2 | 0.2 | 0.2 | 0.2 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |
| 1.0 | 1.0 | 1.0 | 1.0 | 1.0 | 1.0 | 1.0 | 1.0 |

FROM FIG. 8B

| NHL Draft | Olympics (Summer) | Olympics (Winter) | Racing (NASCAR) | Skateboarding | Snowboarding | Soccer (UEFA Men) |
|---|---|---|---|---|---|---|
| 1.7 | 0.52 | 0.52 | 1.7 | 1.74 | 0.0 | 0.29 |
| 1.52 | 1.49 | 1.49 | 1.52 | 0.4 | 0.0 | 0.51 |
| 1.24 | 0.38 | 0.38 | 1.24 | 1.27 | 0.0 | 0.46 |
| 1.86 | 1.63 | 1.63 | 1.86 | 0.22 | 0.0 | 0.55 |
| 1.55 | 1.49 | 1.49 | 1.55 | 0.33 | 0.0 | 0.85 |
| 0.657 | 0.657 | 0.657 | 0.22 | 0.657 | 0.0 | 0.004 |
| 0.783 | 0.783 | 0.783 | 0.097 | 0.783 | 0.0 | 0.001 |
| 0.771 | 0.771 | 0.771 | 0.086 | 0.771 | 0.0 | 0.001 |
| 0.647 | 0.647 | 0.647 | 0.101 | 0.647 | 0.0 | 0.001 |
| 1.67 | 0.66 | 0.66 | 0.83 | 1.45 | 0.0 | 0.35 |
| 5.25 | 0.11 | 0.11 | 1.01 | 0.75 | 0.0 | 0.48 |
| 1.99 | 0.24 | 0.24 | 0.49 | 2.11 | 0.0 | 0.51 |
| 0.19 | 1.59 | 1.59 | 0.78 | 0.78 | 0.0 | 0.19 |
| 0.1 | 1.77 | 1.77 | 1.89 | 1.89 | 0.0 | 0.1 |
| 0.23 | 1.24 | 1.24 | 3.41 | 3.41 | 0.0 | 0.23 |
| 0.33 | 1.15 | 1.15 | 4.12 | 4.12 | 0.0 | 0.34 |
| 0.15 | 2.16 | 2.16 | 2.62 | 2.62 | 0.0 | 0.15 |
| 0.26 | 1.83 | 1.83 | 4.04 | 4.04 | 0.0 | 0.26 |
| 0.038 | 0.001 | 0.001 | 0.412 | 0.001 | 0.0 | 0.038 |
| 0.012 | 0.002 | 0.002 | 0.113 | 0.002 | 0.0 | 0.012 |
| 0.024 | 0.006 | 0.006 | 0.112 | 0.006 | 0.0 | 0.024 |
| 0.008 | 0.005 | 0.005 | 0.074 | 0.005 | 0.0 | 0.008 |
| 0.1 | 0.1 | 0.1 | 0.1 | 0.1 | 0.0 | 0.1 |
| 1.0 | 1.0 | 1.0 | 1.0 | 1.0 | 0.0 | 1.0 |
| 1.0 | 1.0 | 1.0 | 1.0 | 1.0 | 0.0 | 1.0 |
| 1.0 | 1.0 | 1.0 | 1.0 | 1.0 | 0.0 | 1.0 |
| 0.7 | 0.7 | 0.7 | 0.7 | 0.7 | 0.0 | 0.7 |
| 0.0 | 0.0 | 0.0 | 0.0 | 0.0 | 0.0 | 0.0 |
| 0.2 | 0.2 | 0.2 | 0.2 | 0.2 | 0.0 | 0.2 |
| 1.0 | 1.0 | 1.0 | 1.0 | 1.0 | 0.0 | 1.0 |
| 1.0 | 1.0 | 1.0 | 1.0 | 1.0 | 0.0 | 1.0 |
| 1.0 | 1.0 | 1.0 | 1.0 | 1.0 | 0.0 | 1.0 |
| 1.0 | 1.0 | 1.0 | 1.0 | 1.0 | 1.0 | 1.0 |
| 1.0 | 1.0 | 1.0 | 1.0 | 1.0 | 1.0 | 1.0 |
| 1.0 | 1.0 | 1.0 | 1.0 | 1.0 | 1.0 | 1.0 |

FROM FIG. 12A

| | | | | | | | | | | |
|---|---|---|---|---|---|---|---|---|---|---|
| Heath Solcum<br>less than 10 seconds ago | | | | | | | | 110<br>followers | 87<br>following | 46<br>photos |
| Gene Jones<br>less than 20<br>seconds ago | 4,210<br>all | 0<br>arrest | 12,200<br>charity | 0<br>cheating | 0<br>fan<br>reaction | 1<br>fan<br>reaction | 0<br>foundation | 0<br>giving<br>back | 7<br>legal<br>issues | 1<br>peds |
| Brendan Harris<br>half a minute ago | 4,540<br>all | 0<br>arrest | 11,900<br>charity | 0<br>cheating | 0<br>fan<br>reaction | 0<br>fan<br>reaction | 0<br>foundation | 0<br>giving<br>back | 7<br>legal<br>issues | 0<br>peds |
| Ryan Button<br>less than a<br>minute ago | 2,460<br>all | 0<br>arrest | 12,300<br>charity | 0<br>cheating | 0<br>fan<br>reaction | 1<br>fan<br>reaction | 0<br>foundation | 0<br>giving<br>back | 0<br>legal<br>issues | 0<br>peds |
| Esteban Toledo<br>less than a<br>minute ago | 8,990<br>all | 0<br>arrest | 12,200<br>charity | 0<br>cheating | 0<br>fan<br>reaction | 0<br>fan<br>reaction | 3<br>foundation | 0<br>giving<br>back | 0<br>legal<br>issues | 0<br>peds |
| Desmond Wynn<br>1 minute ago | 1,160<br>all | 0<br>arrest | 12,300<br>charity | 0<br>cheating | 0<br>fan<br>reaction | 0<br>fan<br>reaction | 0<br>foundation | 0<br>giving<br>back | 0<br>legal<br>issues | 0<br>peds |

1252:
- FC Dnipro Dnipropetrovsk — 3 days ago
- Eric Hassli — 3 days ago
- external entity — 3 days ago
- external entity — 3 days ago
- external entity — 3 days ago
- Maccabi Haifa F.C. — 3 days ago
- Jose Fernandez — 3 days ago
- FC Viktoria Pzen — 3 days ago
- Hakan Calhanoglu — 3 days ago

| | | | | | | | | | |
|---|---|---|---|---|---|---|---|---|---|
| ADO Den Haag<br>1 minute ago<br>1222c | | | | 580<br>comment | 18,907<br>likes | 9,506<br>post like | 55<br>post rate | 625<br>share rate | 1,941<br>talking about |
| Jesús Hernández<br>1 minute ago | 63,500<br>all | 4<br>arrest | 12,200<br>charity | 0<br>cheating | 0<br>fan reaction | 7<br>fan reaction | 8<br>foundation | 6<br>giving back | 7<br>legal issues | 1<br>peds |
| Nikola Mirotic<br>2 minutes ago | 4,820<br>all | 0<br>arrest | 12,200<br>charity | 0<br>cheating | 0<br>fan reaction | 2<br>fan reaction | 0<br>foundation | 0<br>giving back | 2<br>legal issues | 0<br>peds |

# SYSTEM AND APPARATUS FOR ASSESSING REACH, ENGAGEMENT, CONVERSATION OR OTHER SOCIAL METRICS BASED ON DOMAIN TAILORED EVALUATION OF SOCIAL MEDIA EXPOSURE

CROSS-REFERENCE TO RELATED APPLICATIONS

This application claims a benefit of priority under 35 U.S.C. 119(e) to U.S. Provisional Patent Application No. 61/883,801, filed Sep. 27, 2013, entitled "Social Media Engagement, Influence and Sponsorability System and Method" by Savelli et. al, which is hereby fully incorporated by reference herein.

TECHNICAL FIELD

This disclosure relates to obtaining and using data from disparate social media and other online sites utilizing the varied interfaces employed by those sites, including data on an entity's online and social media presence; and the use of that data to assess the online and social media exposure of an entity by quantifying facets of an entity's social media exposure in a domain specific manner.

BACKGROUND

Endorsement or sponsorship deals with various entities (e.g., athletes, celebrities, politicians, teams, other brands, leagues, etc.) are powerful marketing tools utilized by many brands. It is difficult, however, to quantify the potential efficacy of a marketing association (e.g., endorsement or sponsorship, etc.) with an entity with any degree of certainty. These problems are due in no small part to the fact that any assessment of the visibility, popularity or presence of a potential endorser or sponsor lacks any sort of insight into the reasons behind that status. The visibility could be due to a variety of causes and be due to notoriety or popularity, one of which may be potentially valuable while the other may be anathema to a brand who desires a certain image. Of course, in some circumstances that same notoriety could also be highly desirable for certain brands. As can be seen then, evaluating the potential efficacy of an entity in a marketing role may be difficult.

Such an evaluation may be further complicated by a brand's desire to determine the value of an entity within certain spheres of influence occupied by that entity, namely within a particular domain occupied by that entity. Thus, while it may be useful to attempt an evaluation of an entity's overall efficacy as a marketer, it may also be useful to know an entity's efficacy as a marketer within his or her own specific domain. For example, a brand may desire to determine a baseball player's marketability specifically within the domain of baseball. Part and parcel with this evaluation, then, is a brand's desire to evaluate entities relative to one another and relative to one another within a domain such that entities can effectively be compared with one another to arrive at marketing decisions for a brand. So, to continue with the above example, a brand may desire to know how a particular baseball player compares to other baseball players as relates to marketability.

Complicating the process of these types of marketability evaluations is the fact that, in recent years, insights from online presence, social media and social media conversations are changing the way brands make marketing decisions. Currently, online and social media exposure of entities may be significant criteria in marketing decisions made by brands with respect to endorsement or sponsorship deals with those entities. The assessment of an entity's online and social media exposures is, however, fraught with the same difficulty as the general assessment of the visibility, popularity or presence of an entity. While many social media sites provide some proprietary metrics for exposure generally, it is again difficult to suss out the reasons behind an entity's online and social media exposure. Like exposure generally, not all online or social media exposure is good exposure where most brands are concerned.

Moreover, the ever increasing prevalence of online outlets and social media sites has made an assessment of social media exposure of an entity difficult as well. The sheer number of social media sites across which an entity may have a presence, each of which may expose an entity in a different manner and which provides different methods of interaction and different data models makes the collection and evaluation of such data extremely difficult. Additionally, an entity's social media exposure may not be limited to just that entity's account with a particular social media site, as other users may link to, or otherwise, associate with or promulgate content associated with an entity.

It would thus be desirable to be able to interface with, and obtain data from, disparate online and social media sites despite the varied interfaces and data models used by those sites, amalgamate data on an entity's online and social media presence from these disparate online and social media sites and be able to evaluate that data to assess the online and social media exposure by quantifying facets of an entity's online and social media exposure in a domain specific manner that facilitates comparison between such entities.

SUMMARY OF THE DISCLOSURE

Embodiments described herein provide a social media analytics platform to assist companies or individuals in obtaining and aggregating social content and other content from a variety of sources to, for example, better understand an entity's social media exposure or presence. An entity may be configured with respect to the platform and a number of social media accounts, and other data such as aliases or search terms associated with the entity. Data is collected at certain intervals from the various online sites, including social media sites, using the various disparate and proprietary interfaces and data models provided by the sites and the configurations for the social media accounts associated with an entity. Using this data obtained from these online sites then, (e.g., social media sites or other online source such as a search engine or the like) one or more scores can be calculated or update based on the data, where the score(s) may serve to quantify a facet of the entity's social media exposure and may serve to be domain specific to the entity. The scores for each of the indices for an entity can thus serve to quantify facets of an entity's social media exposure.

Calculating scores for facets of an entity's social media exposure in a domain specific manner and normalizing such scores facilitates the comparing and contrasting of entities to one another within and across both facets and domains. Moreover, in addition to calculating domain specific scores for particular facets of social media exposure an aggregate score that can rank all entities within the database with a single score or ranking (e.g., for a particular facet or an overall score) can also be determined. Such an overall score may allow entities to be compared across domains.

Embodiments of such a social media analytics platform may therefore provide a whole host of advantages. While all data obtained from the online sites by the social media analytics platform, or determined therefrom, can be sortable and searchable, the platform can also be configured to allow a user to conduct searches of entities (such as athletes, teams and leagues to use sports as an example) within or across domains based on their rankings in a particular facet (e.g., reach, engagement and conversation) of social media exposure. This can enable brands to make better decisions on which entities they choose for product endorsements and also creates a social media gauge for analyzing the value of a social media footprint. The platform can also provide metrics on social media content such as tracking top social media posts among all athletes (or other entities) as well as for each individual.

To limit the effect of rate limits imposed in the collection of data from online sites and to effectively deal with the different rate limits that may be imposed by different sites while minimizing the impact on the freshness of the data used by embodiments of a social media analytics platform, embodiments described herein can monitor which data has been acquired for each entity and continually moderate and coordinate data retrieval across the social media platforms or search sites and entities, maximizing the data pulled from each site given the imposed rate limits without slowing or idling the social media analytics platform, while simultaneously limiting the number of errors received from the online sites. For example, if the number of requests using twitter's API has reached or exceeded a capacity or rate limit for a given timeframe, the data from another online site may be gathered until a request rate for twitter falls below the threshold rate limit imposed by twitter. This results in increased efficiencies in time and expense. The analytics platform can spread out requests over time and fully utilize parallel update processes in a way that respects the rate limiting while still achieving near real-time tracking of systems. Moreover, by applying these rate limiting techniques maximum use can be made of the free access granted by such online sites, allowing operators of social media analytics platform to avoid being charged a fee for accessing such data or obtaining a higher rate limit with respect to a particular online site.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the disclosure. A clearer impression of the disclosure will become more readily apparent by referring to the exemplary, and therefore nonlimiting, embodiments illustrated in the drawings. Wherever possible, the same reference numbers will be used throughout the drawings to refer to the same or like features (elements). The drawings are not necessarily drawn to scale.

FIGS. 8A-8E are an illustration of one embodiment of an interface.

FIGS. 9A-9B are an illustration of one embodiment of an interface.

Figure 11B:
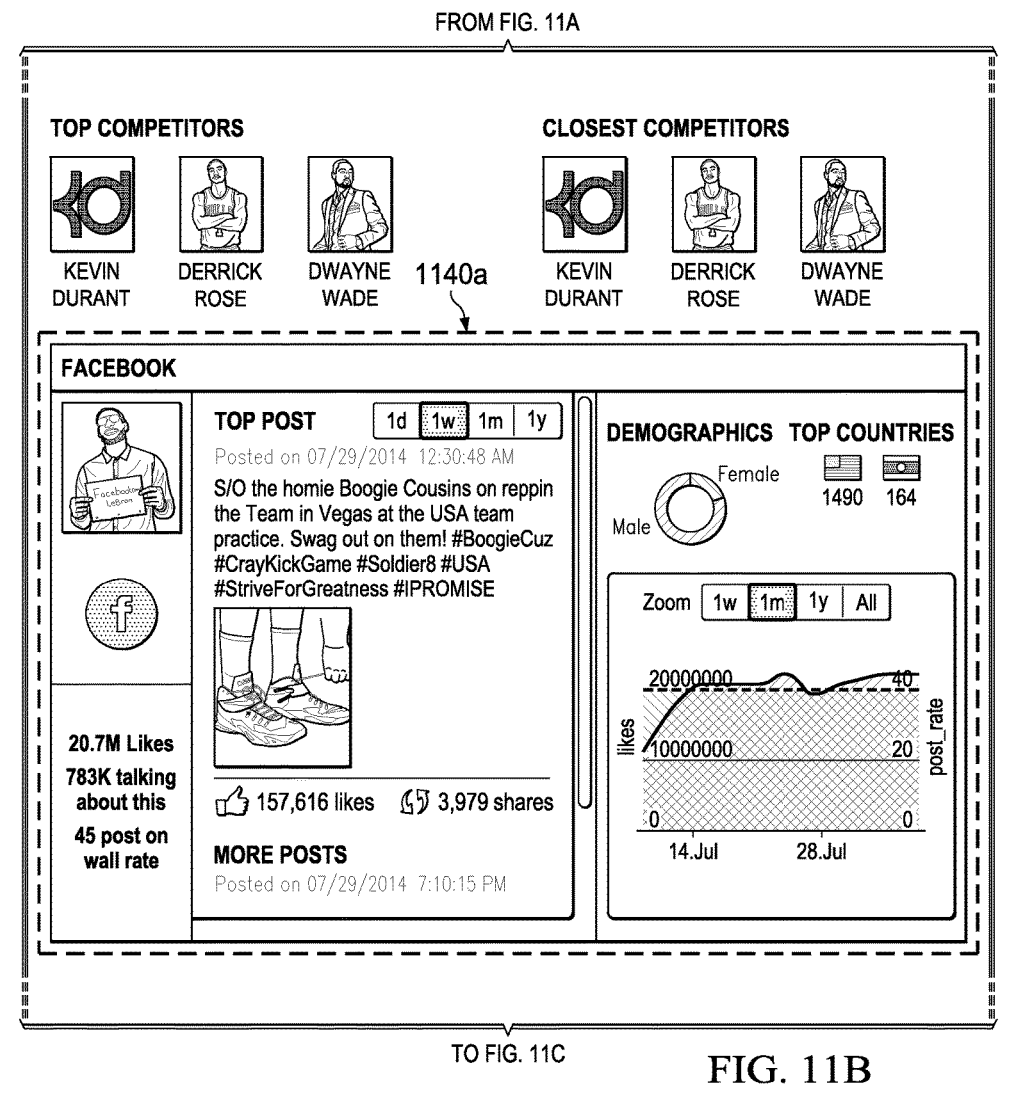

FIGS. 11A-11D are an illustration of one embodiment of an interface.

FIGS. 12A-12C are an illustration of one embodiment of an interface.

DETAILED DESCRIPTION

Figure 1:
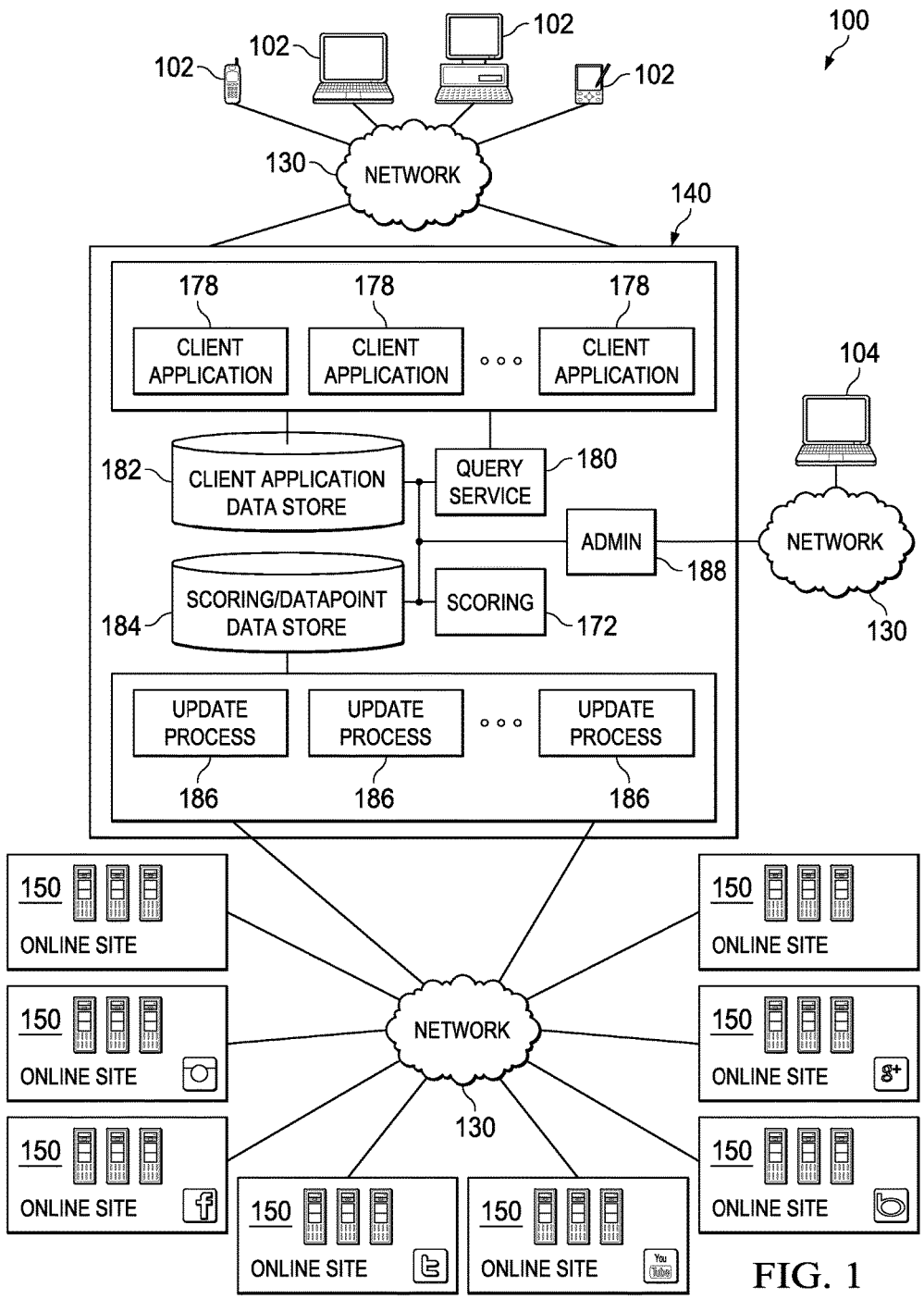
FIG. 1 is a block diagram of one embodiment of an architecture that includes a social media analytics platform.

Embodiments and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments can be implemented in a computer communicatively coupled to a network (for example, the Internet, an intranet, an internet, a WAN, a LAN, a SAN, etc.) or another computer. As is known to those skilled in the art, a computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment, the computer-executable instructions may be lines of C++, Java, JavaScript, or any other programming or scripting code. In an embodiment, HTML may utilize JavaScript to provide a means of automation and calculation through coding. Other software/hardware/network architectures may be used. For example, the functions of embodiments may be shared among two or more computers. In one embodiment, the functions may be distributed in the network. Communications between computers implementing embodiments can be accomplished using any electronic, optical, radio frequency signals, or other suitable methods and tools of communication in compliance with known network protocols.

Communications between computers implementing embodiments can be accomplished using any electronic, optical, radio frequency signals, or other suitable methods and tools of communication in compliance with known network protocols. It will be understood for purposes of this disclosure that a service or module is one or more computer devices, configured (e.g., by a computer process or hardware) to perform one or more functions. A module or service may present one or more interfaces which can be utilized to access these functions. Such interfaces include APIs, interfaces presented for a web services, web pages, remote procedure calls, remote method invocation, etc.

Before delving into more detail regarding the specific embodiments disclosed herein, some brief context may be helpful. As discussed above, assessing an entity's online and social media presence is a desirable, but difficult, task. Entities in this context can be taken to mean a discrete entity of interest such as, for example, an individual (such as an athlete, celebrity, politician, blogger, etc.), a brand, a sports team, etc. The difficulty stems in no small part from the vast number of online outlets through which data on an entity may be present, including the number and variegation of social media sites. These social media sites provide a wide variety of different types of social media for users, collect different data, track or provide different metrics, utilize different methods (e.g., different APIs or other interfaces) for obtaining data, utilize different data models for such data, etc. It is thus difficult both to obtain data from these various sites and to accurately evaluate this data in a manner that lends any insight into an entity's social media exposure. It nevertheless remains desirable to do just that.

To that end, embodiments described herein provide a social media analytics platform to assist companies or individuals in obtaining and aggregating social content and other content from a variety of sources to, for example, better understand an entity's social media exposure or presence. An entity may be configured with respect to the platform and a number of social media accounts, and other data such as aliases or search terms associated with the entity. Data is collected at certain intervals from the various online sites, including social media sites, using the various disparate and proprietary interfaces and data models provided by the sites and the configurations for the social media accounts associated with an entity. Data may also be collected on the entity's online presence in certain categories from various other online sites such as search engines using aliases or other data such as search terms.

Certain online sites such as social media sites or platforms or search sites (collectively online sites herein) may however, present a number of roadblocks to efficient analysis. These online sites provide APIs or other interfaces that may be used by 3rd parties to query the online site to obtain and utilize the data provided by that online site. Depending on the API, in some cases the use of the provided interface is free and in some cases there is a charge, but in any case most online sites have a limit on the quantity or pace of utilization of provided APIs. Such limits are, in the main, imposed by these social media or other sites using rate limiting.

This rate limiting may impose a limit on the number of requests a particular user or site can make using the API provided by the online site within a certain time frame and different online sites may have different rate limits. Thus, for example, Facebook may impose rate limiting by limiting a requestor to utilizing an API for 600 requests per 600 seconds. Twitter may impose a rate limit for 150 requests per 5 minutes using their API. A search engine such as Bing or Google may also impose rate limits with respect to utilizing an API to obtain data on requested web searched. In other word, online sites may stipulate only a certain number of requests may be received from a user using a particular API within a particular time frame or that only a certain number of requests for certain information will be responded to by the site in a particular time frame. If these rate limits are exceeded (e.g., if more than 600 of requests are issued to Facebook within a 600 second window) the online site may not respond or may responds with an error.

As may be imagined in a system with thousands, if not hundreds of thousands or millions of entities, the rate limits imposed by the various online sites can create processing bottlenecks when accessing social media or other data. Additionally, these rate limits may cause data associated with various entities to become stale, thus tempering the efficacy or usefulness of such data. To limit the effect of the rate limits and to effectively deal with the different rate limits that may be imposed by different sites while minimizing the impact on the freshness of the data used by a social media analytics platform, embodiments described herein can automatically monitor which data has been acquired for each entity and continually moderate and coordinate data retrieval across the social media platforms or search sites and entities, maximizing the data pulled from each site given the imposed rate limits without slowing or idling the social media analytics platform, while simultaneously limiting the number of errors received from the online sites. For example, if the number of requests using twitter's API has reached or exceeded a capacity or rate limit for a given timeframe, the data from another online site may be gathered until a request rate for twitter falls below the threshold rate limit imposed by twitter. This results in increased efficiencies in time and expense. The analytics platform can spread out requests over time and fully utilize parallel update processes in a way that respects the rate limiting while still achieving near real-time tracking of systems. Moreover, by applying these rate limiting techniques maximum use can be made of the free access granted by such online sites, allowing operators of social media analytics platform to avoid being charged a fee for accessing such data or obtaining a higher rate limit with respect to a particular online site.

As such, embodiments described herein can be designed to operate in an asynchronous manner. This allows the rate of change for the overall measurement of the social media indexes for an entity to be much higher than the rate limits of the source channels would normally allow. An entity's accounts can be abstracted from the entity itself and the retrieval of each account treated as a discrete atomic operation. This methodology can give updating processes a defined unit of work to do and allows for robust fault-tolerance when online sites encounter issues or downtime. If any errors are encountered during such an update process, errors along with the corresponding account identifier can be placed into a resolution process that may involves a human in the loop before these accounts are again attempted to be utilized by the social media analytics platform, ensuring such errors are not repeated.

Using this data obtained from these online sites then, (e.g., social media sites or other online source such as a search engine or the like) one or more scores can be calculated or update based on the data, where the score(s) may serve to quantify a facet of the entity's social media exposure and may serve to be domain specific to the entity. These domains may include for example, a category of endeavor associated with an entity (such as a sport for an athlete or team, or entertainment for a celebrity). It will be noted that certain domains may be sub-domains of other domains (e.g., acting may be a subdomain of entertainment, NASCAR may be a subdomain of auto racing, etc.). Specifically, in certain embodiments, data obtained from each of the online sites, or derived therefrom, can be weighted according to a domain specific weight for a domain of the entity. The weighted data can then be used to calculate one or more domain specific scores for one or indices.

The scores for each of the indices for an entity can thus serve to quantify facets of an entity's social media exposure. For example, these indices can include a "Reach" index that measures, for example, the overall quantity of followers across the social media platforms (e.g., one or more social media platforms from which data was obtained); an "Engagement" index that, for example, measures the extent of interaction that and individual or entity has with its social media accounts; and a "Conversation" or "Sponsorability" index that measures an entity's name (or aliases, etc.) as associated with positive and negative keywords or other terms to assist in determining if the entity is associated with a positive image through associated terms such as "charity" or "giving back" as opposed to potentially a negative image due to association with words or phrases such as "arrest" or "performance enhancing drugs".

The scores with respect to a facet can also be normalized on a scale. For example, the scores can be normalized from 1-9 with fractional increments between the whole numbers or be otherwise scaled. The scaling of such scores may, in one embodiment, be achieved by normalizing the data obtained from each of the online sites, or derived therefrom, after a domain specific weight is applied to such data.

Calculating scores for facets of an entity's social media exposure in a domain specific manner and normalizing such scores facilitates the comparing and contrasting of entities to one another within and across both facets and domains. Moreover, in addition to calculating domain specific scores for particular facets of social media exposure an aggregate score that can rank all entities within the database with a single score or ranking (e.g., for a particular facet or an overall score) can also be determined. Such an overall score may allow entities to be compared across domains.

Embodiments of such a social media analytics platform may therefore provide a whole host of advantages. While all data obtained from the online sites by the social media analytics platform, or determined therefrom, can be sortable and searchable, the platform can also be configured to allow a user to conduct searches of entities (such as athletes, teams and leagues to use sports as an example) within or across domains based on their rankings in a particular facet (e.g., reach, engagement and conversation) of social media exposure. This can enable brands to make better decisions on which entities they choose for product endorsements and also creates a social media gauge for analyzing the value of a social media footprint. The platform can also provide metrics on social media content such as tracking top social media posts among all athletes (or other entities) as well as for each individual.

The social media analytics platform may therefore have a wide variety of interfaces to enable a user to better interact with the platform and facilitate such a decision making process. These interfaces may include an administrative interface by which entities and the configuration data associated therewith may be specified. This interface may allow an administrator or account holder to customize associated search terms, allowing the addition and deletion of keywords that can be tracked. This enables, for example, a brand to associate their custom keywords to specific individuals for tracking purposes, making the platform more valuable to them.

Furthermore, the mechanism for determining scores or rankings within a facet or domain may not a fixed, static process. Instead, the social media analytics platform can allow for the addition, deletion and updating to the weighting of social media data (or other data). To that end, the administrative interface may allow an administrator to utilize a series of "dials," for the weights to easily adjust the weights utilized in determining a score for a facet within a domain. This allows the analytics platform to continually be optimized based on new sources of data, growth of popularity of one social media platform over another and other factors.

The interfaces may also present data on the entities using a variety of interfaces. According to one embodiment, a "Player Card" may be determined for each entity in the database to create an online social media resume for that entity. An interface presenting the player card for one or all of the entities can be presented to a user by the analytics platform. The data can be further manipulated and tracked for one or more entities by the user. Through interfaces such as the "Player Card" or other interfaces, including for example, a search interface, actual social media content (e.g., posts, tweets, etc.) for entities may be accessed. The ability to access player cards or other interfaces for entities or track entities may be determined by, for example, a subscription that a user has with the operators of social media analytics platform.

It may now be useful to explain certain embodiments of such a social media analytics platform in more detail. Turning then to FIG. 1, an architecture that includes one embodiment of a social media analytics platform is depicted. Architecture 100 includes social media analytics platform 140 coupled, via network 130, to one or more online sites 150 and one or more client computing devices 102 (e.g., laptop computers, desktop computers, servers, mobile devices) that can connect to the social media analytics platform 140 via the network 130. Network 130 may be, for example, a wireless or wired network (or combination thereof), the Internet, an internet, an intranet, a LAN a WAN, an IP based network, etc. Communications over network 130 may be accomplished according to one or more protocols such as, for example, HTTP or SOAP and in one or more formats such as, for example, XML or HTML and may be encrypted using for example a public private key pair, Basic 256, adherence to the X.509 standard, etc.

Users at client computing devices 102 may create or access an account on social media analytics platform 140 to interact with analytic platform 140 and obtain data on various entities. Social media analytics platform 140 itself can comprise one or more physical computing devices which can include one or more physical servers on which modules are deployed. In one embodiment, the social media analytics platform 140 may include one or more modules deployed in a cloud based computing environment using a cloud based service provider, such as Amazon Cloud (e.g., Amazon Web Service or EC2), Microsoft Windows Azure, vMware vCloud, Google's cloud, etc. Thus, such modules may also communicate via a network and according to one or more protocols. By deploying the modules of the social media analytics platform 140 in the cloud increased security, accessibility or reliability may be achieved as the modules may utilize the storage, security, load balancing, or other functionality provided by the cloud provider.

Social media analytic platform 140 may be configured with data, including data about entities of interest. As will be discussed in more detail herein, such data may include an identifier for the entity (e.g., the name of the individual, a brand name, a team, etc.) along with one or more account identifiers for social media sites used by the entity (e.g., twitter handle, name on a Facebook page, YouTube account name, Instagram account name, etc.); aliases for the entity (e.g., nicknames, etc.), a domain for the entity (e.g., baseball for an athlete); a group (e.g., team) with which the entity is affiliated; search terms associated with a particular facet (e.g., conversation), or other data. Social media analytic platform 140 may thus use scoring and data point data store 184 to store this configuration data, including an identifier for the entity, the account identifiers for the entity's social media accounts, search terms, aliases, etc. The data associated with an entity of interest may be used to obtain and store data on the entities from the online sites 150 using interfaces provided by those online sites.

Specifically, online sites 150 may include, for example, one or more social media sites. Social media sites may be interactive Internet based platforms or applications that allow the creation, sharing, exchange or discussion of user-generated or other content. Examples of current social media sites include, for example, Facebook, Twitter, Instagram, Google+, Snapchat, YouTube, etc. In the main, these social media sites 150 allow an entity to post discrete pieces of content and allow other users of the social media site to interact with such content. This content and the interactions may be presented through, and interacted with, an interface offered by, and accessed through, the social media site itself.

In most cases, an entity who wishes to use such a social media site creates an account using an account identifier to facilitate the interaction with the social media site. The entity's content and interactions are thus associated with, and can be identified by, this account identifier. Additionally, when other users of such a social media site reference, or interact with, that entity's content these interactions or references usually utilize the account identifier for that entity's account. Each of these social media sites may maintain proprietary data that may be used as indicators of quantitative measures of social media exposure in association with an account or account identifier. For example, the social media site twitter maintains the number of "followers" associated with an account identifier has; Facebook maintains the number of "likes" for an account's page or content, etc. More examples of such data maintained by social media sites are given in Appendix A and Appendix B. It will be apparent to one or skill in the art that an entity may not have an account or account identifier (e.g., may not use or be active) on every social media site and that there may be lesser, fewer or different social media or other online sites then the ones discussed or illustrated herein.

Each of the social media sites may thus present a particular or proprietary interface (such as an Application Programming Interface (API), web service, or the like) for obtaining data about a particular account, including certain proprietary indicators maintained by that social media site, from the social media site according to a proprietary data model used by that particular social media site. For example, an interface may be provided by the social media site through which an account identifier can be provided to the social media site. In response the social media site returns certain data associated with the account identifier, including data points such as proprietary indicators associated with that account identifier (such as those listed in Appendix B) or actual social media content associated with that account identifier (or identifiers thereof).

Online sites 150 may also include search providers such as Google or Bing from which data can be obtained through for example, a keyword or other search term (which will be used interchangeably herein) search implemented through, for example, an interface (e.g., API) offered by those search providers. Specifically, the number of "hits" for a particular search (e.g., one or more terms with or without included Boolean operators) may be obtained from such search providers. In some cases additional data may also be provided through such interfaces such as portions of the content (e.g., text data, etc.) associated with the "hits" for the search term.

Online sites 150 can also include other online sites with other data about entities. These may include sites such as rating service from analytics companies such as KRED, Peer Index and Klout. These types of sites may also provide proprietary interfaces through which such scores can be obtained.

It is thus possible for social media analytics platform 140 to utilize the interfaces provided by the online sites 150 to obtain data about an entity such as that listed in Appendix A or B and store such data. Such data may include:

Reach Data: for example, data that quantifies how many people the entity of interest interacts with. The data can include information, such as quantity of followers and friends for each individual across each social media platform, views of social media pages, likes for the entity's pages, or other similar data.

Engagement data: for example quantitative metrics concerning quantity of interaction, such as commenting, re-tweeting or sharing, that the individual has with these friends and followers or other similar data.

Conversation Data: for example, data based on the alignment of specific names (or aliases) of entities along with specific positive and negative keywords such as "positive fan interaction" or negative fan reaction", "arrested", "charity", etc.

Social Media content: for example, actual content data such as atomic pieces of social media content such as tweets, Facebook posts, etc. that is associated with an entity of interest.

Other content: News feeds or other content about, or relevant to, an entity of interest.

Rankings or scores affiliated with the entity from other services.

The data obtained from each of the online sites 150 for each entity can be stored in association with that entity in data store 184. The data can then be analyzed to provide the information to users of the social media analytics platform 140 with measures of facets of the entities social media exposure. Specifically, a Reach, Engagement and Conversation score for an entity may be calculated for a domain associated with that entity. To calculate scores for a particular facet within a domain, data associated with that index may be weighted using a weight specific to that data, that domain and that index. Examples of data and its association with a particular facet are given in Appendix B. The weighted data for that entity, index and domain is then used to calculate the final score for that entity and facet within that domain.

Both the weighted data or the final score may be normalized to facilitate comparison across entities. For each calculation, an administrator of social media analytics platform 140 has the option to utilize the same algorithm across all individuals for each category, or to utilize individual algorithms based on domain (e.g., sport), facet (Reach, Engagement, Conversation) or other criteria. The ability to change the algorithm can be available to the administrator within an administrative interface. Scoring data, ratings services, and affinity data from other services and/or sentiment ratings can also be added for any of the three categories of Reach, Engagement and Conversation and weighted as the administrator sees fit. This provides flexibility to add data feeds and alter and amend the algorithms and weighting as need or desired. It can be further noted that the platform can be extended to calculate other social media metrics.

It will now be helpful to delve into one embodiment of the architecture of a social media analytics platform in more detail. It should be noted that this embodiment of an architecture is provided by way of example and that any suitable architecture may be utilized. In one embodiment then, social media analytics platform 140 may utilize a data services architecture. According to one embodiment, the data services may involve the interaction of multiple virtualized or real machines in a "Network of Services" architecture or "Service Oriented Architecture." Each physical or virtual machine can run a single or multiple instances of one of several modules hosted on a server. According to one embodiment, each data service module can have a specific interface (e.g., Application Programming Interface (API)) that responds to requests from other services (such as client applications or other data services applications) via calls (e.g., over Ethernet using the Hypertext Transport Protocol (HTTP) or other protocol). Each of the hosting servers can be physically or virtually separate from the others to allow for scalable processing of parallel requests.

Such data service modules may include, scoring service module 172, update process module 186 and query service module 180. Moreover, social analytics platform 140 includes analytics client application data store 182 and scoring and data point data store 184. Analytics platform 140 may include a database management application or other content management system (not shown) to manage data in the data stores 182, 184. It should be noted at this point that the division of functionality into the various modules as will be explained is provided by way of example and various services such as rate monitoring, prioritization, scoring, updates, client services, data store management, etc. can be provided through execution of any number of modules (e.g., greater or fewer) to provide the same or similar functionality.

Analytics client application module 178 may be responsible for interacting (e.g., receiving or responding) with requests from user computing device 102 received over network 130, and specifically from browsers or applications (e.g., "apps" on mobile devices) or the like on the user computing devices 102. Thus, client application module 178 may provide interfaces that include certain data to client browsers and, in turn, may provide data to be stored in a data stores 182, 184 or interact with the other modules (e.g., data services modules or the like) of the social media analytics platform 140, or data stores 182, 184, to obtain or provide such data. To facilitate the interaction between the analytics client application 178 and data service modules of the social media analytics system 140, in one embodiment, the data services modules and the analytics client application module 178 can utilize a single master or multiple slave database servers that maintain a primary record of state across the entire system (not shown). Query service module 180 may allow specific user queries received through an interface provided by analytics client application module 178 to be run against scoring data store 184 to return results to analytics client application module 178 such that it can be presented to a user through an interface.

Client application data store 182 includes information on users of the social media analytics platform 140. In one embodiment, the social media analytics platform 140 may offer multiple levels of accounts. Account information associated with account holders (referred to also as users) may be stored in client application data store 182 including, for example, username and password for the account, an account image or avatar, entities in which the user is interested, such as their top entities or their "team" of entities (e.g., athletes with which the user may have a sponsorship or endorsement agreement), their top watched athlete, etc. This data may be used in managing a user's account and may be used to by client application module 178 to determine what information to access and present to the user through one or more interfaces.

In one embodiment, the social media analytics platform 140 may include features to facilitate timely responses to users on devices 102, such as load balancing and caching. In one embodiment, for example, a load balancer may be utilized, where the load balancer acts as a reverse proxy and handles even distribution between the multiple instances of analytics client application module 178. Load balancing in this way allows the system to automatically scale the analytics client application module 178 during periods of high load.

A cache may also be maintained of commonly-requested data that the client application module 178 can utilize in order to avoid longer running and costly calls to a data service module or a data store 182, 184. The caching layer can reside between the data services modules or the data stores 182, 184 and manage a temporal store of key-value pairs that expire in such a way that stale data is refreshed prior to being displayed to the user. According to one embodiment a caching layer can be provided using memcached to cache content that requires long-running tasks or calls to online sites 150. The expiration times of these caches can be set on a case-by-case basis to balance the rate-limiting policies of the specific social media applications against the relative life-span of the data.

In any event, analytics client application module 178 may receive a request from a browser or application at user computing device 102 (e.g., as forwarded by a web server or directly in embodiments where analytics client application module 178 includes a web server component). In general, analytics client application module 178 resolves such a request into the resources used to assemble the response which may include, and be associated with, a web page to provide in response to the request. These resources may depend on the interface requested as will be discussed in more detail and may include items or entities referenced in the web page or used to generate the web page source. The analytics client application module 178 can resolve a single request to one or more resources. These resources may include resources from a cache management layer, resources from a data store 182, 184 or resources from one or more of the other modules of social media analytics platform 140.

If the request requires responding with information from a data services module or data store 182, 184, the analytics client application module 178 can request the information from the data services module or data store 182, 184. For example, if a requested web page includes scoring information for an entity, the analytics client application module 178 can query the caching layer or the appropriate data store 182, 184 for the appropriate information. The caching layer, module or data store 182, 184 can return the requested information to the analytics client application module 178. The analytics client application module 178 can then assemble the various pieces of information gathered from the data store 182, 184, or module to generate the response (e.g., web page) to return back to the user browser, mobile application, etc. Specifically, analytics client application module 178 may present interfaces that utilize scores for facets of social media exposure for entities associated with particular domains as determined by, for example, scoring service module 172. A list of interfaces implemented by client application module 178 will be discussed in more detail at a later point herein.

Administrative module 188 may allow an administrator (e.g., accessing interfaces provided by the administrative module 188 from administrator's computer 104) to configure the social media analytics platform 140. This includes configuration of the various entities that may be monitored by the social media analytics platform 140. Thus, administrative module 188 may provide interfaces that allow the creation of updating a database of entities (e.g., individuals, brands, teams, and agents) and identifiers for their respective social media accounts. This database may, for example, be stored in scoring and data point data store 184. Within this database, a list of entities (athlete, brand, team, or agent) can be maintained that contains identifying information (e.g., id and name) and domain information (e.g., sport) for each. For each of these entities, a list of "social accounts" can be maintained that contains a social account type (i.e., YouTube, twitter, Instagram, etc.) and an account identifier for that athlete on that social application (e.g., twitter screen name, YouTube user ID, Facebook page name, etc.). Each entity may have none, one, or more social account for each type of social media. Additionally, the database can contain aliases for the entity for use in web-crawler based searches (e.g., Chris Paul→CP3, Chad Johnson→Chad Ochocinco, Astros→'Stros, etc.) or search terms to be used therewith.

Administrative module 188 may also provide an interface to allow the tuning of algorithms, weights and parameters that will be used in generating the scores for an entity in conjunction with various facets, as will be discussed in more detail at a later point herein. In order to accomplish this, in certain embodiments an interface can be provided that gives access to authorized person to modify the "knobs and switches" (e.g., parameters) of an algorithm used for generating a score for a facet for a particular domain. For example, according to one embodiment, a user (e.g., an administrator) can be shown an interface having a series of graphical dials or indicators that the administrator can "turn" or otherwise modify (e.g., using a touch screen, mouse or other input device) to tune the weights.

For each domain then, the administrative module 188 can provide an interface with the scoring algorithm for a facet and that domain, and the data points used by that algorithm, where the interface allows a user to set the relative weights for each of the data points for that facet and domain. The administrative module 188 can also provide an interface such that an administrative user can disable or enable any of the data points used in determining the score for a facet in a domain. A data point that is disabled can still be collected and stored but may not be used in the calculation of a score for a facet for a particular domain (this may be effectively the same as setting the weight of that data point to zero). The algorithms for each facet and domain including the respective weights for each data point for that algorithm may be stored in scoring and data point data store 184. In one embodiment, such an algorithm may be applying a weighted average using the respective weights for each data point as will be discussed. According to one embodiment, only the relative values within a domain may impact the final score for an entity as a score for a facet may have already been normalized for a particular domain.

In one embodiment, the weights for a facet and a domain may be grouped into "versions" that allow an administrator to prepare a set of weights to be used beginning on a particular day. Additionally, this creates a history of weightings such that previous scores can be reconstructed in the future for retro-active scoring. One advantage to allowing the administrator to set weights on such scoring algorithms is that the system can be adapted to changing sentiment. For example, while having a celebrity's name associated with the term "arrested" may be generally thought of as negative, it may turn out that being arrested increases exposure and public perception of the celebrity. Therefore, an administrator may, for example, change the weight data points from negative to positive or the change weights so that certain data points become more influential on the final score.

Moreover, administrative module 188 may allow the configuration of one or more search terms to be used in conjunction with one or more facets. For example, a Conversation facet may be based on data points determined based on a number of conversation categories. These categories may, in general, fall into a negative group (e.g., cheating, arrest, negative fan reaction, legal issues, performance enhancing drugs, etc.) and a positive group (e.g., charity, giving back, positive fan reaction, foundation, etc.). Thus, data points associated with each of these conversation categories may be gathered by using terms associated with each of these categories. In one embodiment, administrative module 188 allows a user to manage the conversation categories. Here, a user could add, remove, or modify a conversation category. Each conversation category may have a name, a weight, and a "positive" or "negative" flag. Within each conversation category, an administrative user can manage a list of terms that can be searched for in relation to an entity to determine a data point value for that conversation category. These data points may be determined using a search provider (such as Bing or Google) and searching on the terms associated with a conversation category and, for example, an entity's name or alias. Alternatively, search terms may be associated with an individual entity. In any event, each entity may be deemed to have a "conversation account" and the conversation categories and their corresponding search terms may be stored in scoring and data point data store 184.

Thus, such an administrative interface 188 may allow a user to, for example:
- List, add, view, set, delete, and modify entities (e.g., individuals, brands, teams, and agents).
- List, add, view, set, delete, and modify domains associated with an entity (e.g., a sport, league, etc.).
- List, add, view, set, delete, and modify social accounts for each entity
- List, add, view, set, delete, and modify the data points gathered for each social account for each entity
- List, add, view, set, delete, and modify the conversation categories and the search terms used for each conversation category or entity.
- List, add, view, set, delete, and modify aliases, etc. for each entity.
- List, add, view, set, delete, and modify the algorithms or weights used in those algorithms for each facet and domain.

Some social media APIs provide links to other social media accounts. Thus, the administrative module 188 may also give the user the option of "auto-discovering" other social media handles for a given athlete based on these links. These links, in some embodiments, may be a "best-effort" guess by the administrative module 188 and can require user-intervention to be properly configured, but can be helpful in providing hints to the user when setting up an athlete's social media accounts.

Based on the configuration in scoring and data point data store 184 (e.g., as set through administrative module 188 interface), the social media analytics platform 140 can periodically obtain data from online sites 150 and store such data in scoring and data point data store 184 using one or more update processes 186. Each online site 150 may have a different API (that may be published by that site) and provide different data. Update process module 186 can communicate with online sites 150 using their proprietary APIs (e.g., over the Internet), web search servers, and other servers that can provide social media data or content related to the entities (e.g., search results, news feeds, etc.)

Thus, update process 186 may periodically send a request associated with an entity (e.g., a particular account of an entity) configured in scoring and data point data store 184 to a particular online site 150 using that site's proprietary API and store the data returned by the online site 150 in conjunction with that entity and that account in scoring and data point data store 184. For a social media site, update process 186 may use the API of that site to interact with the site to provide an account identifier associated with that social media site through the API to obtain data associated with that account identifier. Such data may include numerical data points associated with that account. Update process 186 can then update scoring and data point data store 184 with the data received from the social media site along with metadata or statistics concerning that data using the identifier for that social media content so that the latest information is available in scoring and data point data store 184. Thus scoring and data point data store 184 can be used both as a repository for writing data points and as a source against which all queries required for proper operation of the rest of the system are run.

By way of example, for twitter, such numerical data points may include, a number of tweets, number of replies, number of followers, number following, retention rate, retweet rate, etc. For Facebook, such numerical data points may include the number of likes for the account's page, number of wall posts, post rate, number of comments, comment rate, number of shares, talking about, post like rate, share rate etc. For Google+ such numerical data points may include activities, plus ones, shares, replies, etc. For Instagram such numerical data points may include photos, followers and following. For YouTube such numerical data points may include videos, views, subscribers, interactions, etc.

Additionally, using an API provided by a social media site and the account identifier for an entity, update process 186 may interact with the social media site to obtain actual social media content (or identifiers of atomic pieces of social media content through which the piece of social media content may be obtained or accessed) and metadata or statistics associated therewith, such as, for example, for twitter the most (e.g., the top ten) retweeted tweets, for Facebook the most popular posts (e.g., the five most popular), YouTube the most popular videos, etc. Update process 186 can use the external identifiers of these pieces of content (as are typically provided by social media sites) to ensure that no duplicate content is stored in scoring and data point data store 184.

In some cases, it may be preferable that a single update process 186 be responsible for taking a snapshot of a particular account (e.g., to prevent two processes from simultaneously requesting the same information). Accordingly, an update process can place a reservation on an account that allows that update process to atomically claim ownership over the account so that the account is not processed by two update processes simultaneously. According to one embodiment, a reservation can be asserted through the use of metadata in the scoring and data point data store 184 or other mechanism associated with that account.

Each time a new piece of social media content is encountered, the update process 186 can update metadata or statistics concerning that social media content using the identifier for that social media content so that the latest information is available in scoring and data point data store 184. Rather than retaining a copy of the actual social content, scoring and data point data store 184 may contain a reference to the social content (e.g., the location or an identifier of each piece of social content) such that the social media content may be fetched by a client device (e.g., through incorporation of the reference in a web page or other interface provided to the client device).

Moreover, in certain embodiments, update process 186 may also be configured to obtain updates from a social media site on pieces of social media content obtained previously. For example, update process 186 may determine that a particular piece of social media content associated with a social media site was not returned or otherwise identified in response to a request to that social media site (e.g., a piece of social media content previously identified as a "most popular" is no longer identified as such). In these instances, update process 186 may contact the social media site again to determine a data point corresponding to the popularity of this previously identified piece of social media content (e.g., by providing the identifier for this atomic piece of social media content to the social media site to obtain such a data point). Data points on historically identified social media content may thus be kept current in scoring and data point data store 184.

In addition to social media sites, online sites 150 may include other sites or source from which data points may be determined. In one embodiment, data points for a Conversation score are determined based on the frequency of occurrence of the entity's name or aliases in conjunction with a set of terms. Specifically, scoring and data point data store 184 may include a set of conversation categories, each conversation category associated with one or more search terms (as discussed above). Each domain may have a specific set of conversation categories and search terms associated with those categories; the set of conversation categories may be the same across domains and each domain may have domain specific search terms for those conversation categories; or both the categories and search terms may be the same across categories. Online sites 150 may include search sites or providers (e.g., Bing, Google, etc.). Thus, using a publicly available search engine API for a particular search site, update process 186 can submit a request to a search site to obtain a number of search results that contain an entity's name or aliases and one or more of a set of terms associated with a conversation category. Each conversation category can be defined to correspond to positive or negative public image of an entity (for example, may include "cheating", "charity", "arrested" "giving back", etc.).

These data points (e.g., number of search results associated with a submitted search for a conversation category for a particular entity) can be stored in scoring and data point data store 184 in association with the entity and conversation category along with metadata or statistics on such data points.

Accordingly, each snapshot (e.g., response to a particular request using an online site's interface which may or may not be associated with metadata or statistics such as a timestamp), or data obtained therefrom, for a given account at a given social media site may be time-stamped and stored in scoring and data point data store 184 in association with the entity holding that account such that scoring and data point data store 184 holds historical information for entities and their accounts. Thus, for a particular entity, the scoring and data point data store 184 may include data collected from multiple online sites including aggregated social media content (e.g., posts, tweets, etc.).

It should be noted that the different accounts and online sites 150 can be treated as separate for purposes of update. Thus, not only is each entity updated asynchronously, but each account of an entity may also be updated asynchronously. For example, the twitter information and Facebook information for an entity may be updated by update process 186 (or two different update processes 186) at different times using different requests. Consequently, entity data for one social media site may be updated even if, for example, another social media site cannot be accessed. Multiple update processes 186 may be operating simultaneously. It should be noted that new update processes and APIs can be added as needed or desired to the update process 186.

Update process 186 can also be configured to determine whether a given snapshot has been successfully retrieved and placing the account back into the "idle" state such that it can be polled again based on future prioritization. (The "idle" state represents one in which the account is not queued or currently prioritized for snapshotting.) If an error occurs during the retrieval of a given snapshot, the update process can determine whether the error is one that can be recovered from with time or one that is indicative of incorrect social media account information or a more permanent issue with the system or social source service. To this end, for each social media site, an update process 186 can maintain a set of recoverable error states. Each error reported can be compared against these states to determine the recoverability or level of criticality for the error. If the error is one that cannot be automatically recovered from, the error can be placed in a state that requires human operator intervention. In this case, the account is not placed back in an "idle" state and will not be prioritized for snapshotting until the error state is changed. A human or programmatic operator can review the error, history of the account and other information in order to ascertain the true nature of the error and determine whether to return the account to the pool of "idle" accounts or whether more intervention or corrective actions are required.

As can be seen then, in certain embodiments, scoring and data point data store 184 can comprise data points for an entity collected from multiple online sites 150 at different times using the proprietary interfaces provided by those online sites. These data points can include, for each entity, a set of numerical data points provided from each social media site with which the entity has an associated account identifier; a set of numerical data points provided or determined from a search site associated with an entity and a conversation category; and one or more atomic pieces of social media content (or identifiers of atomic pieces of social media content through which the piece of social media content may be obtained or accessed) that may be associated with the entity. Thus, a numerical data points can be a single raw quantification of an aspect of one social media site. Additionally, data stored in scoring and data point data store 184 from online sites 150 may be correlated with an entity. For example, an entity may have a variety of social media accounts and scoring and data point data store 184 can include the information necessary to correlate these various accounts with that entity.

As the social media analytics platform 140 can score entities based on their social media activity and online information about the entities, it may be preferable that such scoring be done on up to date data. However, in many cases online sites 150 limit the number of requests (e.g., through an API) or the amount of data that may be requested in a given time period (e.g., such social media sites may utilize rate limiting). Update process 186 may thus be configured to interface with scoring and data point data store 184 (or management functionality associated therewith) to determine rate monitoring data and update prioritization data using for example, statistics or metadata associated with snapshots obtained from an online site. This rate monitoring data or update prioritization data can be used by update process 186 to ensure periodic updates occur in an efficient manner according to any limits imposed by such online sites 150.

In some embodiments, the update processes 186 may connect to source social media systems subject to the rate monitoring data. Specifically, it can be determined based on the amount of data pulled from each online site 150 subject to rate limiting and a corresponding time period if the social media analytics platform 140 is exceeding data limits imposed by an online site 150. If so, the update processes can delay updating data from an online site 150 for which the platform 140 is near, at or over capacity. Similarly, based on online site 150 whose rate limits have not been exceeded, and accounts on those sites that are amongst a group of least recently updated accounts, update process 186 may select an account for one or more of those sites to update.

According to one embodiment, a user-configurable (e.g., administrator) set of metadata is maintained that defines the number of calls allowed to each online site over a certain period of time. In this way, variability in the rates allowed by social media sources can be reacted to quickly and robustly. Each time an update process 186 is available, it can poll a rate determiner for how much capacity is available for each online site 186.

The rate determiner maintains the state of each of the online sites 186 with respect to the number of requests that have been executed against each source. This information is gathered from a data store (e.g., the scoring and data point data store 184) containing a history of data collected from online site 186. By polling this data store, the rate determiner is able to calculate the capacity used and capacity remaining based on the metadata above. According to one embodiment, the system looks for the number of snapshots (or number data points) taken over the past timeframe specified in the metadata. This amount is subtracted from the allotted amount in the metadata to arrive at the number of snapshots that can be currently requested.

Each update process 186 can be substantially continually running and polling the rate determiner for available capacity. Based on the availability of capacity for a particular online site 150 the update process 186 can build a list of accounts that are ready for updating for social media sources that have capacity at that time. If one or more online sites 150 are at, or past capacity, or within some threshold, of capacity, the update process 186 can automatically promote the sources that are available when determining which accounts to update.

Social media analytics platform 140 can attempt to prioritize certain accounts based on how old or recent their last successful data point collection was. For example, accounts that have not have not had a snapshot taken in relatively long time may be prioritized above accounts that had snapshots taken of them more recently. In other embodiments, accounts may be prioritized based on other metrics. For example, accounts that generally have a lot of activity or have been less recently updated may be prioritized more highly than accounts that have little activity. Other criteria and combinations of criteria, including user set parameters, can be used prioritize accounts.

In general, when an update module 186 becomes available it can reserve the highest priority accounts and queue them for snapshotting (subject, in some embodiments, to API switching considerations). To this end, an update process can poll the data store (e.g., the scoring and data point data store 184) for a number (N) of the highest priority accounts to be updated. The update process can reserve all or some of these accounts and retrieve data points for the reserved account. According to one embodiment, however, the update process 186 can take a random sample of accounts (less than N) that are prioritized for collection. This is done to ensure that no single error in a social media account causes the entire process to lock up because the account that experienced an error is less likely to be picked up repeatedly. Embodiments of such update processes 186 are discussed in more detail below.

Using the data points associated with an entity obtained by update process 186 from online sites 150 stored in scoring and data point data store 184, scoring service module 172 can score entities on facets of their social media exposure for their domain. In one embodiment, scoring service module 172 may run on a periodic basis (e.g., nightly) to generate scores for each entity configured in scoring and data point data store 184 based on the domain associated with the entity. Thus, the scores for an entity can be calculated based on the most current data points available for that entity obtained from online sites 150. Such scores may be stored, for example, in a data store 182, 184 or in a caching layer and used by client application module 178 in providing interfaces in between runs of scoring service module 172.

Specifically, in one embodiment, a score may be generated for each facet (e.g., Reach, Engagement, Conversation) within a domain associated with the entity using the algorithm and weights for each data point specific to that facet and that domain. These scores can be, for example, decimal numbers scored on a scale of 0 to 9 (or otherwise scaled). These scores may, in turn, be averaged or otherwise used to calculate an overall index score that can be used, for example, in rankings or for entities against one other.

Thus, to generate a score for a particular facet for an entity associated with a domain, scoring service module 172 may access scoring and data point data store 184 to obtain the algorithm, associated data points used by the algorithm and the weights associated with those data points for the domain of the entity. Scoring service module 172 also accesses scoring and data point data store 184 to obtain the values (e.g., numerical values) associated with that entity for each of the data points associated with the algorithm for that facet and that domain if they exist. According to one embodiment, scoring service module 172 may normalize the value for these data points to a rolling average for that domain. By way of example, but not limitation, each data point may be normalized to the 28-day rolling average for that data point for that domain (e.g., a data point for number of twitter followers for an entity in the domain of basketball may be normalized to a 28-day rolling average of the number of twitter followers for all basketball players). In another embodiment, the data points may be normalized based on the average score for all entities or otherwise defined.

Scoring service module 172 can then get a score from these normalized data points by applying the algorithm for that facet and domain using the normalized data points and the weights associated with each data point. In one embodiment, the score may be generated by multiplying each normalized data point by a configured weight for that data point, domain and facet and taking the average of each of the weighted data points for that facet (e.g., Reach, Engagement or Conversation) for that entity. As has been noted, each different type of data point may be assigned a different weight (e.g., the number of Facebook followers may have a different weight than the number of twitter followers when determining a Reach score) and the weights for the type of data point may vary based on domain (e.g., the number of Facebook followers may have one weight for baseball players and another weight for basketball players).

In order to avoid saturation of the output, the average score can be fed through a function to control the distribution of scores. These functions may include, for example, inverse functions or sigmoid functions. Inverse functions may be useful in cases where a score is based off a starting score of 0. For example, in one embodiment, this may be the case with Reach and Engagement scores such that the average score for each of the Reach and Engagement categories is fed through a reciprocal function specific to a domain:

$$1 - \frac{1}{C \cdot x + 1}$$

where x is the raw category score, and C is a constant that can be set by an administrator (e.g., using an administrator interface 188) to control the width of distribution of the output across all entities in a domain or across domains. In other embodiments, other functions can be used to control distribution.

Other functions may be useful where a baseline for a score is selected starting score (e.g., 7 out of 10). For example, Conversation may include negative conversation categories that represent negative effects on an entity's public image and positive categories that represent positive effects. Each of the weighted data points for each of these conversation categories may thus be used to adjust the baseline score by a negative or positive amount. Since Conversation has the possibility of being both negative and positive, a sigmoid function, or function, can be used to prevent saturation of the output. In one embodiment the following may be used:

$$\frac{1}{1 + e^{-C \cdot x}}$$

where x is the raw Conversation score, and C is a constant that can be set by an administrator to control the width of distribution of the final Conversation scores in a domain or across domains.

In another embodiment the average score for a category may be fed through a sigmoid function such as:

$$\frac{e^{2 \cdot C \cdot x} - 1}{e^{2 \cdot C \cdot x} + e^C}$$

where x is the category's weighted average and C can be used to tune the midpoint resolution (starting at a value of 3 or 7). For positive x values, this function can, for example, return a value in the range [0, 1].

Scoring service module 172 can thus generate a score for a facet of social media exposure for an entity in a domain. Scores for each entity can be stored in association with that entity in scoring and data point data store 184 or a caching layer and used by analytics client application module 178 in providing interfaces in responses to a request from a browser or application at user computing device 102 (e.g., as forwarded by a web server or directly if the analytics client application module 178 includes a web server component). Embodiments of such interfaces will be discussed in more detail at a later point herein.

Figure 2:
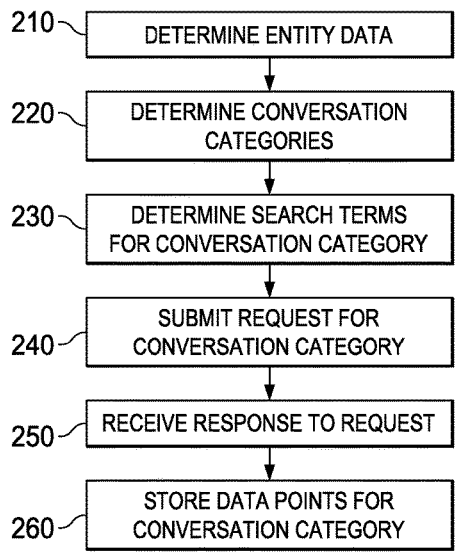
FIG. 2 is a flow diagram of one embodiment of obtaining data associated with a facet of social media exposure.

Turning now to FIG. 2, one embodiment of a method of obtaining data points associated with a Conversation score for an entity is depicted. Such an embodiment may, for example, be used by embodiments of an update process or the like.

At step 210, the data on the entity for which data is being gathered may be determined, by, for example accessing a scoring and data point data store and determining a domain associated with that entity. Additionally during this step the aliases associated with the entity may also be determined. Once the domain and other data associated with the entity is determined, at step 220, each of the conversation categories (e.g., associated with that domain) can be determined and at step 230 the search terms for that conversation category for that domain may be determined. Examples of conversation categories may include, a negative group of conversation categories (e.g., cheating, arrest, negative fan reaction, legal issues, performance enhancing drugs, etc.) and a positive group of conversation categories (e.g., charity, giving back, positive fan reaction, foundation, etc.).

For each of the conversation categories, a corresponding request may be submitted to an online search provider at step 240 (e.g., one request for all conversation categories, one request per conversation category, or one request for multiple, but less than all, conversation categories). The submitted request may include the search terms for that conversation category and the entity's name and any aliases. The request to the online search provider may request that one or more searches be performed the entity name, aliases and search terms (e.g., with one or more Boolean operators such as AND or OR between the entity name, aliases or search terms). In one embodiment, such a request may also indicate that the entity name, aliases or search terms appear in the title of any result. Such a request is formatted according to the API provided by that online site.

At step 250 the results of the request are received from the online search provider. These results may either be a numerical indication of the number of results associated with the submitted search in the request or may be a listing of actual results from which such a numerical indication of the number or results can be derived. This numerical indication is stored, at step 260, as a data point for that conversation category for that entity in that domain.

Figure 3:
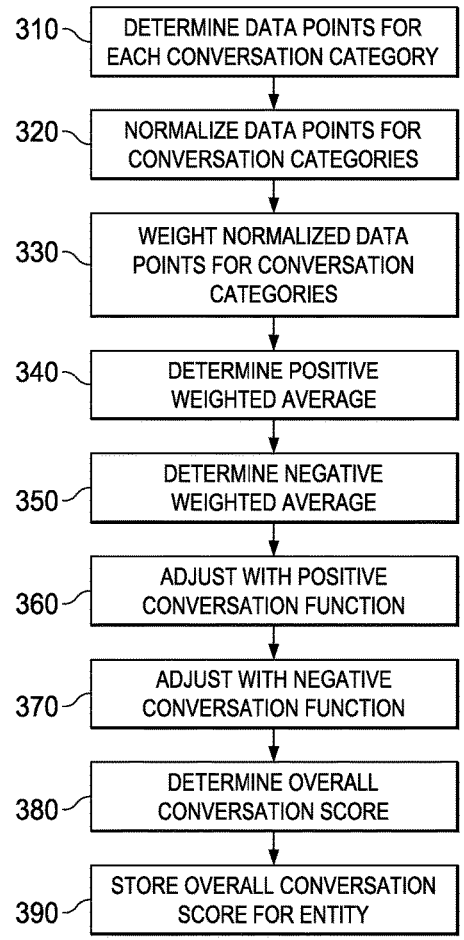
FIG. 3 is a flow diagram of one embodiment of a method for generating a score for a facet of social media exposure.

Moving now to FIG. 3, one embodiment of a method of using data points in determining a Conversation score is depicted. Such a method may be used, for example, by embodiments of a scoring service module. Initially then, at step 310 when a Conversation score is to be determined the data points (e.g., numerical values for the data points) for each conversation category for the entity and a domain of that entity may be determined. Once the data points for that entity and domain are determined, at step 320 for each of the conversation categories, the value for the data point associated with that conversation category may be normalized. In one embodiment, for example, the data point may be normalized to a 28-day rolling average for that data point for that conversation category and that domain.

Once the data points are normalized, at step 330 each of the normalized data points may be weighted using a weight specific to that conversation category and domain. The weights utilized with a conversation category may have been selected to achieve a certain distribution or average of scores of for other reasons. The conversation categories themselves may be divided into a negative group (e.g., cheating, performance enhancing drugs, etc.) and a positive group (e.g., charity, giving back, etc.) as discussed. Accordingly, at step 340 a positive weighted average may be determined by taking the taking the average of each of the normalized and weighted data points for each of the positive conversation categories for that entity and domain. Similarly, at step 350 a negative weighted average may be determined by taking the taking the average of each of the normalized and weighted data points for each of the negative conversation categories for that entity and domain.

The weighted average for the positive conversation categories can then be passed through a positive conversation sigmoid function at step 360 to generate an adjusted positive weighted average. This sigmoid function may be associated with the domain and serve to control the distribution of the positive average score and can be tuned based upon, for example the desired distribution of the positive category weighted average or the distribution of the final conversation score, or on a wide variety of other criteria. The weighted average for the negative conversation categories can also be passed through a negative conversation sigmoid function at step 370 to generate an adjusted negative weighted average. This sigmoid function may again, be associated with the domain and serve to control the distribution of the negative average score and can be tuned based upon, for example the desired distribution of the negative category weighted average or the distribution of the final conversation score, or on a wide variety of other criteria. It will be noted that the negative conversation sigmoid function may be the same as, or different, than the negative conversation sigmoid function and may be independently adjusted based on different criteria.

Using the adjusted positive weighted average and the adjusted negative weighted average at step 380 an overall conversation score may be generated for that entity with respect to the domain. More specifically, in one embodiment, a starting value for the conversation score for that domain may be obtained and adjusted by subtracting out the adjusted negative weighted average and adding the adjusted positive weighted average to give a final conversation score for the entity and that domain. This final conversation score may be stored in association with the entity in step 390.

Figure 4:
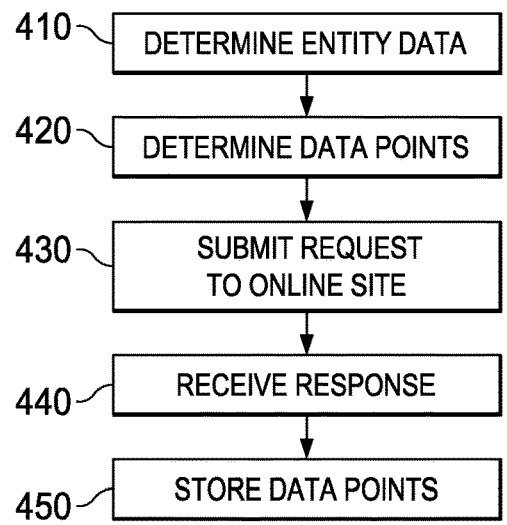
FIG. 4 is a flow diagram of one embodiment of obtaining data associated with a facet of social media exposure.

Moving now to FIG. 4 one embodiment of a method of obtaining data points associated with a Reach or Engagement score for an entity is depicted. Such an embodiment may, for example, be used by embodiments of an update process or the like. At step 410, the data associated with the entity for which data is being gathered may be determined, by, for example accessing a scoring and data point data store and determining a domain associated with that entity. Once the domain associated with the entity is determined, at step 420, each of the data points associated with that domain and the facets of Reach and Engagement can be determined. Each of these data points may be associated with a particular online site. For example, for the facet of Reach, data points may be for the online site twitter a number of followers; for Instagram the number of followers, for Facebook the number of likes, for YouTube the number of videos or subscribers. For the facet of Engagement, data points may be for the online site twitter a number of tweets, the number following, the mention rate and the retweet rate; for Instagram the number of photos and the number following, for Google+ the activities, plus ones, shares and replies; for Facebook the talking about number, the post rate, the comment rate, the post like rate and the share rate and for YouTube the number of videos and interactions.

For each of the online sites, a corresponding request may be submitted to that online site at step 430. The submitted request may include an account identifier for the entity along with the requested data points identified for the Reach and Engagement facets. The request to the online search provider may indicate that the requested data points associated with that account identifier should be returned. The request may also specify that particular pieces of social media content should be returned such as, for example, the most popular content, the most viewed content, the most commented content, etc., or may request information on an identified piece of social media content. Such a request is formatted according to the API provided by that online site. As is discussed elsewhere herein, data points associated with a particular account for an entity with respect to a particular online site may be obtained using different requests for each of those accounts where those requests may be submitted in an asynchronous manner to those particular online sites.

At step 440 the results of the request(s) are received from the online site. These results may either be a numerical indication of the number of results associated with the submitted search in the request, actual pieces (or identifiers) of social media content or both. This data is stored, at step 450, as historical data associated with the corresponding account for that entity in that domain. As has been discussed the data points associated with a particular account for an entity with respect to a particular online site may be obtained using different requests for each of those accounts where those requests may be submitted in an asynchronous manner to those particular online sites. Thus, a time-stamp indicating when the historical data associated with the entity and that account may be stored in conjunction with that historical data for that entity and that account.

Figure 5:
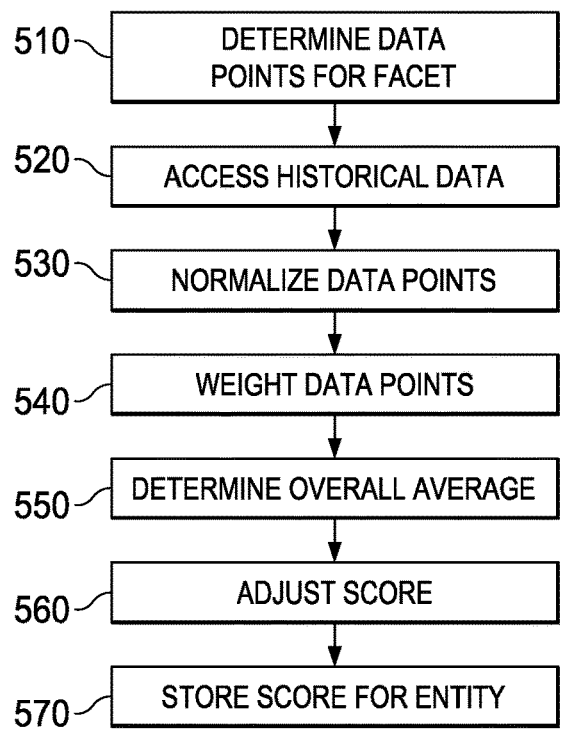
FIG. 5 is a flow diagram of one embodiment of a method for generating a score for a facet of social media exposure.

Moving now to FIG. 5, one embodiment of a method of using data points in determining a Reach or Engagement score is depicted. Such a method may be used, for example, by embodiments of a scoring service module. Initially, at step 510, when a Reach or Engagement score is to be determined the data points (e.g., numerical values for the data points) associated with that facet (e.g., Reach or Engagement) for the entity and the domain of that entity may be determined. Specifically, a configuration for the facet and the domain may be accessed and the data points to be used in determining the score for that facet within that domain may be determined. For example, for the facet of Reach, data points may be for the online site twitter a number of followers; for Instagram the number of followers, for Facebook the number of likes, for YouTube the number of videos or subscribers. For the facet of Engagement, data points may be for the online site twitter a number of tweets, the number following, the mention rate and the retweet rate; for Instagram the number of photos and the number following, for Google+ the activities, plus ones, shares and replies; for Facebook the talking about number, the post rate, the comment rate, the post like rate and the share rate and for YouTube the number of videos and interactions. Historical data associated with the entity may then be accessed at step 520 to determine the value for each of the data points for the facet being calculated for the entity.

Once the data points for that entity associated with the facet and the domain are determined, at step 530 each of the data point associated with the facet (e.g., Reach or Engagement) may be normalized. In one embodiment, for example, the data point may be normalized to a 28-day rolling average for that data point for that conversation category and that domain.

Once the data points are normalized, at step 540 each of the normalized data points may be weighted using a weight specific to that facet and domain. To determine the weights to apply for a particular facet and domain a configuration for the facet and the domain may be accessed and the weights to be used in determining the score for that facet within that domain may be determined. The weights utilized with a particular facet may have been selected to achieve a certain distribution or average of scores of for other reasons.

An overall average score for the facet may then be determined at step 550. In one embodiment, overall average score may be generated by taking the average of each of the weighted data points for that facet (e.g., Reach, Engagement) for that entity. The score for the facet may then be adjusted at step 560 to obtain a final score for the facet. This adjustment may serve to control distribution of the scores for a facet within a domain. For example, the overall average score for the facet can be fed through a reciprocal function specific to a domain:

$$1 - \frac{1}{C \cdot x + 1}$$

where x is the raw category score, and C is a constant that can be set by an administrator (e.g., using an administrator interface) to control the width of distribution of the output across all entities in a domain or across domains. In other embodiments, other functions can be used to control distribution. This final score for the facet for the entity in the domain may be stored in association with the entity in step 570.

Figure 6:
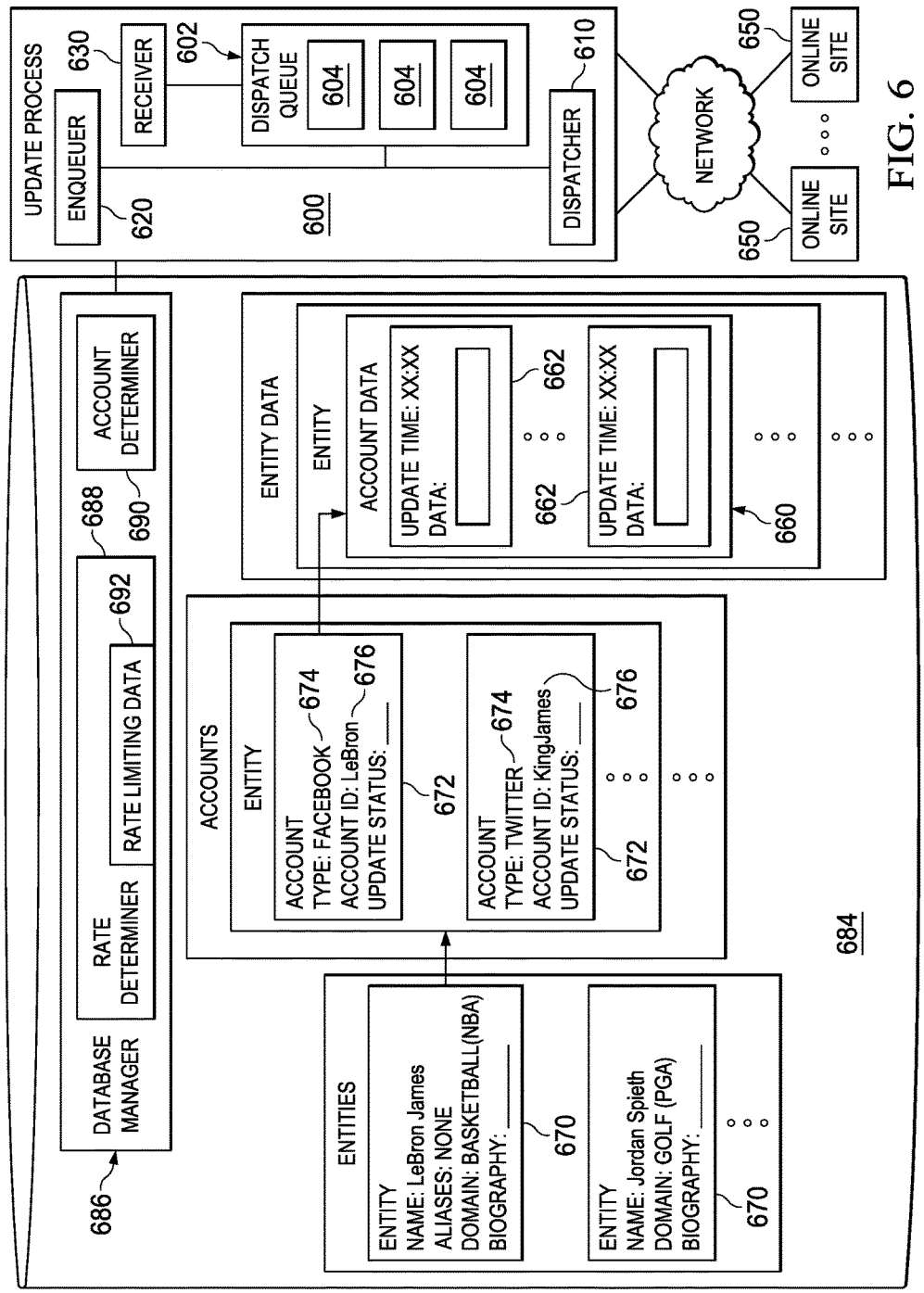
FIG. 6 is a block diagram of one embodiment of an update process and associated data store.

Now that embodiments of obtaining and using data from various online sites in the generation of scores for certain facets has been explained it may now be useful to go into more detail regarding embodiments of how such data may be obtained from online sites. Turning then to FIG. 6, a block diagram of one embodiment of an update process and associated data store is depicted. In this embodiment, update process 600 may issue requests to online sites 650 to obtain data on accounts associated with online sites 650 subject to rate limiting imposed by online sites 650. In such an embodiment, scoring and data point data store 684 may maintain a set of entities 670, each entity 670 includes a set of accounts 672 for that entity 670 where each of the accounts 672 includes an account type 674 and account identifier 676 corresponding to an online site 650 (e.g., twitter, Facebook, Google+, etc.). It will be understood that each entity has an account type corresponding to an online search provide such as Bing or Google. While such an account type may not include a specific account identifier such as those used with certain online sites 650 (e.g., a twitter handle, a Facebook page name, etc.), the entity name or aliases can be considered account identifiers 676 for such an account type 674.

Each entity 670 may be associated with corresponding online site data 660 for that entity 670. Specifically, online site data 660 for an entity may include on or more historical snapshots 662 associated with each account 672 of the entity. Thus, each historical snapshot 662 may include a timestamp or the like denoting when that account 672 was last updated. Each account 672 may also have metadata associated with it denoting that the account is currently being update or has been reserved or queued for updating.

Scoring and data point data store 684 may be accessed or otherwise managed using database manger 686 which includes a rate determiner 688 and an account determiner 690. Rate determiner 688 may have access to rate limiting data 692 (e.g., as configured by an administrator or the like) corresponding to each of the online sites 650. This rate limiting data 692 associated with an online site 650, as discussed above, may include a number of requests that may be submitted to that online site 650 in a particular time period. Rate determiner 688 can thus be configured to receive a request to determine which online sites 650 are currently available for a request given the rate limiting data 692 associated with that online site 650 and the timestamps associated with the snapshots 662 of each account 672 (and the account type 674 associated with that account).

Specifically, when rate determiner 688 receives such a request, for each of the online sites 650 it can access the associated rate limiting data 692 and determine a time period of interest for that online site 650 (e.g., if twitter only allows 150 requests every five minutes a time period of interest may be five minutes for twitter). By accessing the timestamps of snapshots 662 associated with accounts 672 of entities 670 that are of an account type 674 associated with that online site 650 the number of requests submitted to that online site within the time period of interest can be determined. This number of requests can be compared with a request number of interest determined from the rate limiting data associated with that online site 650 (e.g., if twitter only allows 150 requests every five minutes a request number of interest may be 150 requests for twitter) to determine if there are any available request slots for that online site 650 subject to the rate limiting data 692 (e.g., if the number of requests defined by the rate limiting data for that online site exceeds the number of snapshots from that online site 650 during a previous time period equal to the time period defined by the rate limiting data). In response to the received request, rate determiner may identify any online sites 650, if any, for which request slots are available.

Account determiner 690 can thus be configured to receive a request to determine a number of time ordered account identifiers 676 or account types 674 associated with one or more online sites 650. Specifically, account determiner 690 may receive a request specifying one or more online sites 650 and a number of accounts identifiers to return. When account determiner 690 receives such a request, for each of the identified online sites 650 it can access the timestamps of snapshots 662 associated with accounts 672 of entities 670 that are of an account type 674 associated with that online site 650 to determine those accounts that were least recently updated. These accounts 672 can be sorted based on the time they were last updated and the requested number of account identifiers 676 and account types 674 for the accounts 672 that were the least recently updated may be returned in response to the request. Thus, for example, if a request specifies only Facebook as an online site 650 and 10 as the number of accounts 672 to return, the account determiner 690 may return Facebook account identifiers 676 for the 10 least recently updated Facebook accounts sorted in order of least recently updated. As another example, if a request specifies both Facebook and twitter as online sites 650 and 10 as the number of accounts 672 to return, the account determiner 690 may determine the least recently updated Facebook and twitter accounts 672 and return account identifiers 676 for the 10 least recently updated accounts that are either Facebook or twitter sorted in order of least recently updated.

Update process 600 may therefore utilize database manager 686 to issue requests to online sites 650 subject to rate limiting imposed by online sites 650. Update process includes a dispatch queue 602. Each entry 604 in dispatch queue 602 corresponds to a request to be sent to a particular online site 650 for a particular account identifier 676. For example, an entry 604 may corresponding to a request to be sent to twitter to obtain data (e.g., numerical data points or other data) for a particular twitter account associated with an account identifier 676 for an entity 670. Queue 602 may have a certain number of slots for these entries, which may be determined, for example, by the number of update processes 600 being used, the computing environment or capabilities (e.g., processor speed, memory, bandwidth, etc.) of the physical computer on which update process 600 is implemented or for other reasons.

Enqueuer 620 may place entries 604 onto dispatch queue 602. More specifically, either based on a number of open slots in queue 602 or based on same time interval (e.g., every 5 seconds), enqueuer 620 may request an identification of online sites 650 which may have requests issued on them from rate determiner 688. Enqueuer 620 receives a response identifying any online sites 650 for which for which request slots are available given the rate limits associated with those sites 650. Using the identified online sites 650 received in response to this request, enqueuer 620 may request a certain number of account identifiers associated with those online sites 650 from account determiner 690. The response from account determiner 690 includes account identifiers 676 for that number of least recently updated accounts 672. From these least recently updated accounts 672 enqueuer 620 may select a certain number to place on dispatch queue 602. The number selected may be determined based the number of slots available in dispatch queue 602 or by some other metric and which of the accounts 672 of the least recently updated accounts 672 received are selected may be determined by random selection or by some other metric. Once the accounts 672 are selected, an entry 604 associated with the selected account 672 containing information associated with the account such as the account identifier 676 or account type 674 may be place on the dispatch queue 602. Additionally, enqueuer 620 may mark that account 672 as being currently updated in data store 684 such that it may be accounted for by rate determiner 688 and account determiner 690 (e.g., accounted for in determining rate limits by rate determiner 688 and not selected or used by account determiner 690).

Dispatcher 610 may access an entry 604 on the queue 602 and using data contained in the entry 604, including the account identifier 676 or account type 674, prepare and dispatch a request to the corresponding online site 650 according to the proprietary interface utilized by that online site 650. Specifically, dispatcher 610 may utilize configuration information associated with the account type 674 to determine what data to obtain from that online site 650 and make a request for that data associated with that account identifier 676 to that online site 650 according to that online site's proprietary interface.

Receiver 630 may receive responses to requests issued by dispatcher 610. The data from these responses may be written by receiver 630 to scoring and data point data store 684. In particular, receiver 630 may write the received data as a historical snapshot 662 and associated timestamp associated with the corresponding account 672 of the entity 670 associated with the request which generated the received response. Any indication that this account 672 is currently being updated associated with the metadata for the account may also be removed.

Update process 600 can be responsible for deciding whether a given snapshot has been successfully retrieved and placing the account back into the "idle" state such that it can be polled again based on future prioritization (the "idle" state represents one in which the account is not queued or currently prioritized for snapshotting.) If an error occurs during the retrieval of a given snapshot, the update process can determine whether the error is one that can be recovered from with time or one that is indicative of incorrect social media account information or a more permanent issue with the system or social source service. To this end, for each social media source, an update process can maintain a set of recoverable error states. Each error reported can be compared against these states to determine the recoverability or level of criticality for the error. If the error is one that cannot be automatically recovered from, the error can be placed in a state that requires human operator intervention. In this case, the account is not placed back in an "idle" state and will not be prioritized for snapshotting until the error state is changed. A human or programmatic operator can review the error, history of the account and other information in order to ascertain the true nature of the error and determine whether to return the account to the pool of "idle" accounts or whether more intervention or corrective actions are required.

Figure 7:
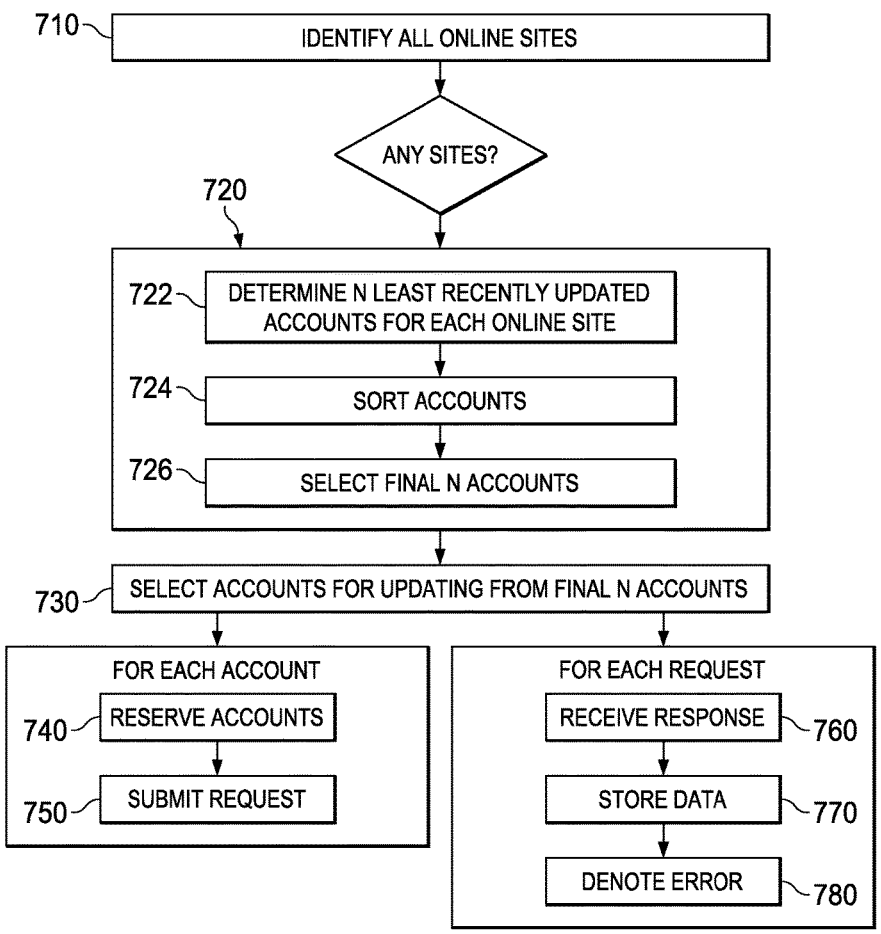
FIG. 7 is a flow diagram of one embodiment of a method for a method for updating data from online sites.
Figure 8E:
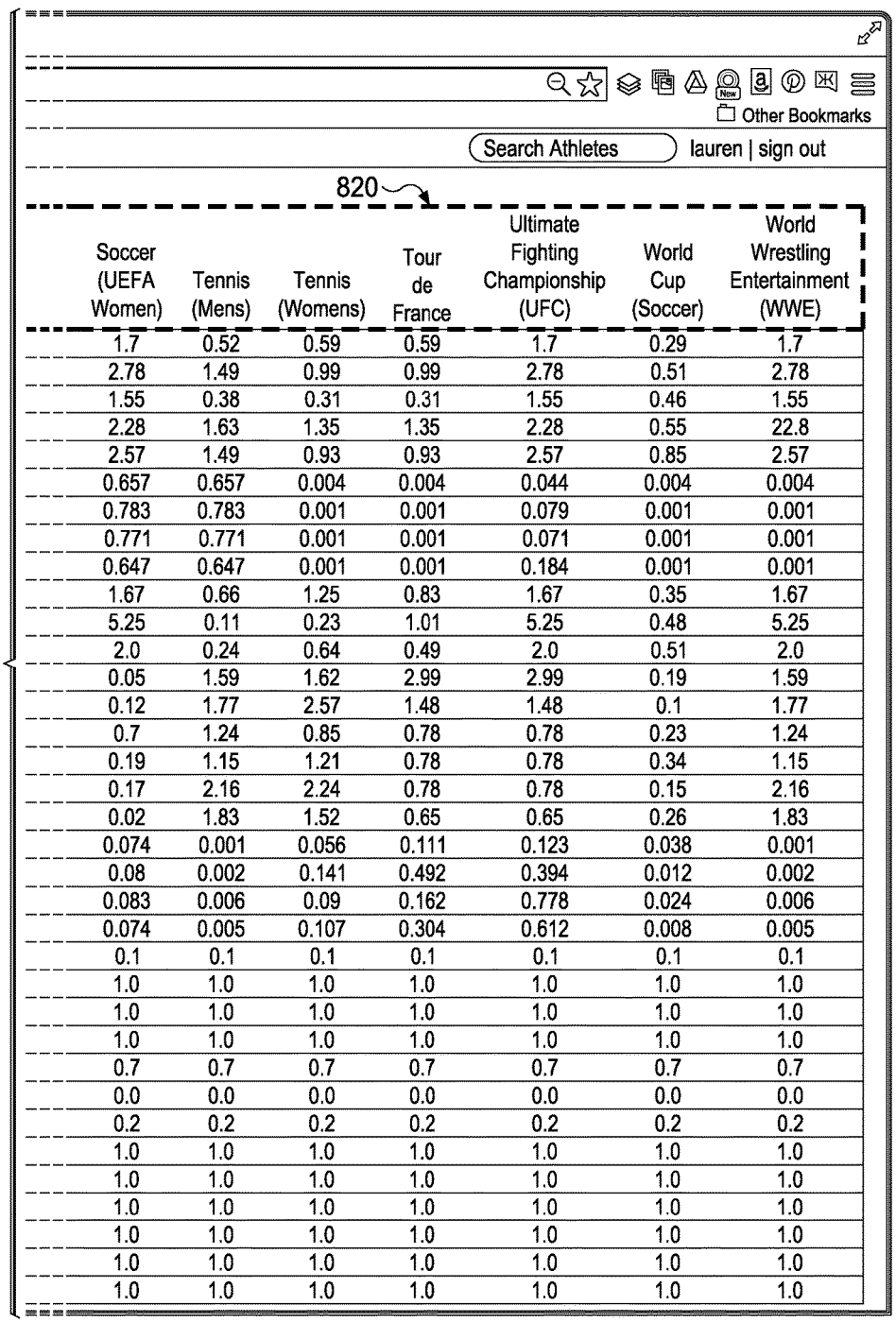

FIG. 7 is a flow diagram of one embodiment of a method for a method for updating data from online sites. Such a method may be employed, for example, by embodiments of an update process in a social media analytics system to update data points associated with a social media account or to obtain data from a search provider associated with a conversation category.

Thus, at step 710, an identification of all online sites from which to data may be requested is determined. This determination may be based on rate limiting data associated with each of the online sites. Specifically, each online site may have a corresponding request number (or request size) and request time period that may serve to define a rate limit for that online site. For each of the online sites then, data denoting when requests were previously sent (e.g., requests that have been completed during the time period, to that online site during a time period associated with the rate limiting for the online site. This data can be determined by determining each account of an account type associated with that online site and for each account of that account type accessing each of those accounts (e.g., a twitter account, an Instagram account, etc.) to determine how many of them have historical data (e.g., a snapshot) associated with them that was obtained within the request time period or how many of them have been marked as being currently updated or reserved for updating. In this manner, the number of requests that have been made to that online site within the request time period may be determined. The determined number of requests may be compared to the request number to determine if there is any difference and commensurately if any additional requests may be made to that online site without exceeding any rate limit imposed by that online site. Each online site for which additional requests may be made can therefore be identified.

If no online sites are identified (e.g., a rate limit associated with all online sites has been reached) after a certain time period the identification may be attempted again. Otherwise, based on the online sites that were determined in step 710, a number of accounts (N) (e.g., associated with an account identifier) for at least one of those online sites may be determined at step 720. The number determined may be configured by an administrator or may be determined based on a requesting process based on, for example, a number of open slots in which requests can be made to such online sites. Here, for each of the online sites identified at step 710 a number (N) of accounts associated with that online site that have been least recently updated may be determined at step 722. This data can be determined by accessing each account of the account type associated with the online site (e.g., that are not marked as being currently updated or reserved for updating) and the timestamp associated with the most recently obtained historical data associated with that account. Based on the timestamps associated with the historical data for those accounts, the number (N) of those accounts that were least recently update may be determined. Thus, at the end of this step there may be a number (N) of accounts identified for each online site for which requests may be made to that online site without exceeding any rate limit imposed by that online site.

At step 724 all of the accounts for all of those online sites obtained at step 712 may then be sorted based on the timestamps associated with the historical data for those accounts. At step 726 a final number (N) of accounts from these sorted accounts that were least recently updated may be selected without regard to the type of account. In other words, at this point there may be a number (N) of accounts associated with any online site identified at step 710 which have been least recently updated, regardless of the account type or online site.

At step 730 one or more of the final (N) accounts determined in step 724 may be selected for updating. This selection may be done randomly from the final number (N) of accounts or may be done on other criteria, such as least recently updated or the like. The selected accounts may be reserved for updating at step 740 by denoting each of these accounts as being currently updated. This designation may for example, comprise entering or updating metadata associated with that account in a data store containing data on that account.

At step 750, for each of the selected accounts the associated account identifier for that account may be used to submit a request to the online site associated with that account. Specifically, each online site may have a proprietary interface by which data from that online site may be obtained. A configuration associated with that online site or account type may be accessed to determined information to include in the request. This data may include the account identifier or data points or social media content to obtain if the online site is a social media site; or the search terms or an entity's aliases to be used in a search in the case where the online site is a search provider. Using this data a request may be formed according to the proprietary interface used by that particular online site and the request submitted to the online site. It will be noted here that each request associated with each account may be submitted asynchronously to one another and a different time.

For example, it may be determined that the online site associated with the account is the search provider site and the data store may be accessed to determine the set of search terms associated with each conversation category and the name (or aliases) associated with the entity. A request for values for each conversation category based on the search terms for the conversation category and the name of the entity may be formed (e.g., requesting a search be performed for each conversation category based on the search terms and the entity's name or aliases).

A response to the request may be received at step 760. If the request to the online site for the account was successful the data (e.g., a snapshot of historical social media content or numerical data points, data points associated with a search provider such as a number of hits returned from a search, etc.) and a corresponding timestamp may be stored at step 770 and any metadata or other data associated with reserving or otherwise identifying the account as being updated may be changed to reflect that the account has been updated or is no longer reserved for updating.

Again, it will be noted here that similarly to the requests associated with each account, the response to each request associated with an account may be received asynchronously to one another and a different time (e.g., the steps 740, 750, 760, 770 and 780 may be going on substantially simultaneously or asynchronously to one another). Thus, the requests and responses for each individual account for each individual entity may be updated separately and asynchronously from one another in a manner that conforms to different rate limiting imposed by each individual online site at which those accounts are maintained. Additionally by determining which accounts have been least recently updated and allowing those accounts to be selected or scheduled for updating data associated with the various entities may be kept substantially current while still conforming to such rate limits.

If the request was not responded to, or an error was received, at step 780 metadata associated with the account may be entered to denote error with respect to the account and account identifier. An administrator may be notified or an account flagged in administrator interface.

Referring now to FIGS. 8A-12C, embodiments of interfaces that may be used by embodiments of a social media analytics platform are illustrated. With reference first to FIGS. 8A-8E, an illustration of one embodiment of an interface that may be used for scoring administration is depicted. Such an interface may allow an administrator of a social media analytics platform to set or alter the weights associated with different data points from different online sites for each domain to which an entity may belong. The weights for the different data points and domains may be used in determining a score for a facet of social media exposure for an entity within that domain.

Here, the interface 800 may present a table of weights. Area 820 may include a set of domains to which an entity may be assigned by an administrator. These domains include, in the example illustrated in FIGS. 8A-8E, Football (NFL), Formula 1, Basketball (NBA), Golf (PGA Tour), Hockey (NHL), etc. Area 810 may include a set of data points, each of the data points associated with an icon identifying a corresponding online site or account type. For example, one data point 812 may be the number of tweets from the online site twitter; another data point 812 may be shares from the online site Google+; another data point 812 may be photos from the online site Instagram; another data point 812 may be likes from the online site Facebook; another data point 812 may be videos from the online site YouTube; another data point 812 may be the giving back Conversation category which is the number of hits returned from the online site Bing for an entity and search terms for that category, etc.

Each weight may indicate the weight of that particular data point to utilize when calculating a score for a facet which uses that data point in the associated domain. For example, a weight of 1.7 may be used with the number of tweets from the online site twitter when used in calculating a score for the domain of Formula 1; a weight of 2.99 may be used with the number of likes from the online site Facebook when used in calculating a score for the domain of Basketball (NBA), etc. Using interface 800 an administrator may alter these weights by, for example, clicking on the weight itself, which may bring up a data entry interface allowing the administrator to change the numerical weight assigned to that data point with respect to that domain.

Figure 9A:
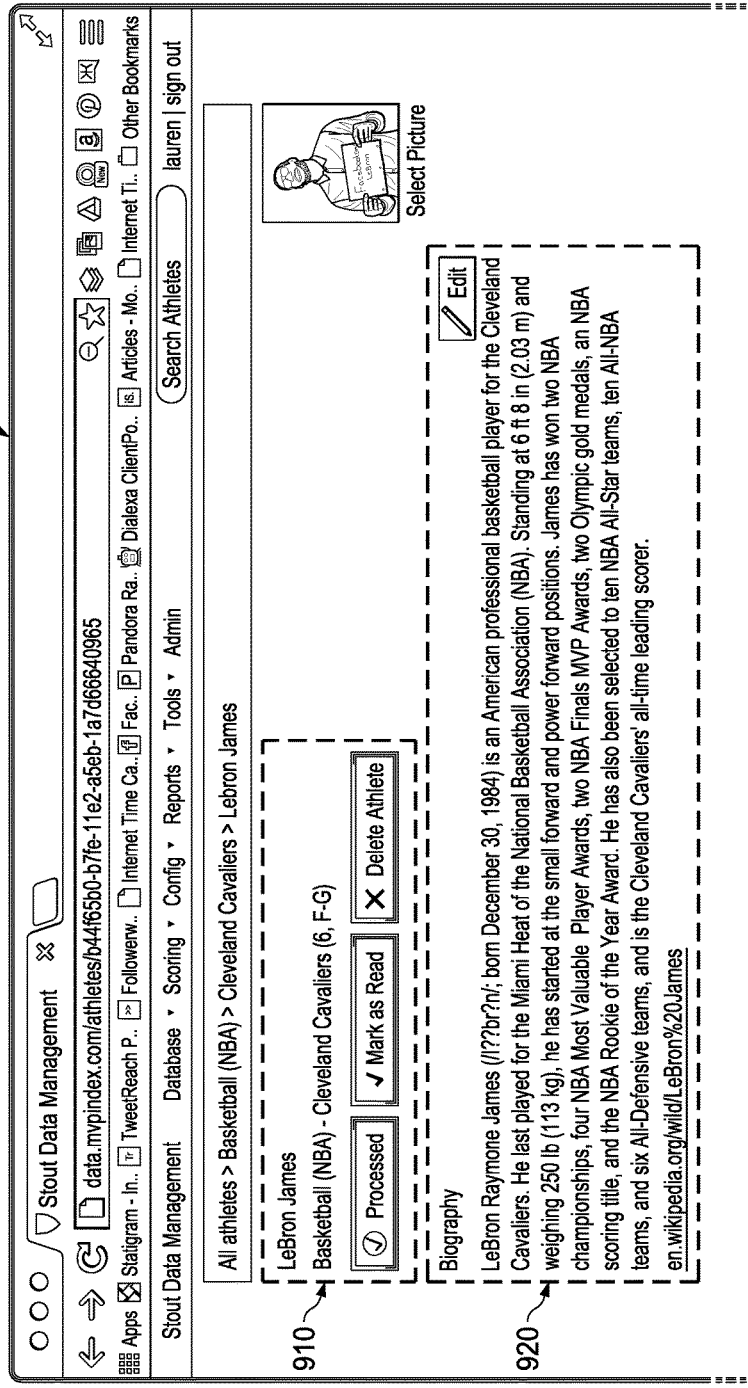
Figure 9B:
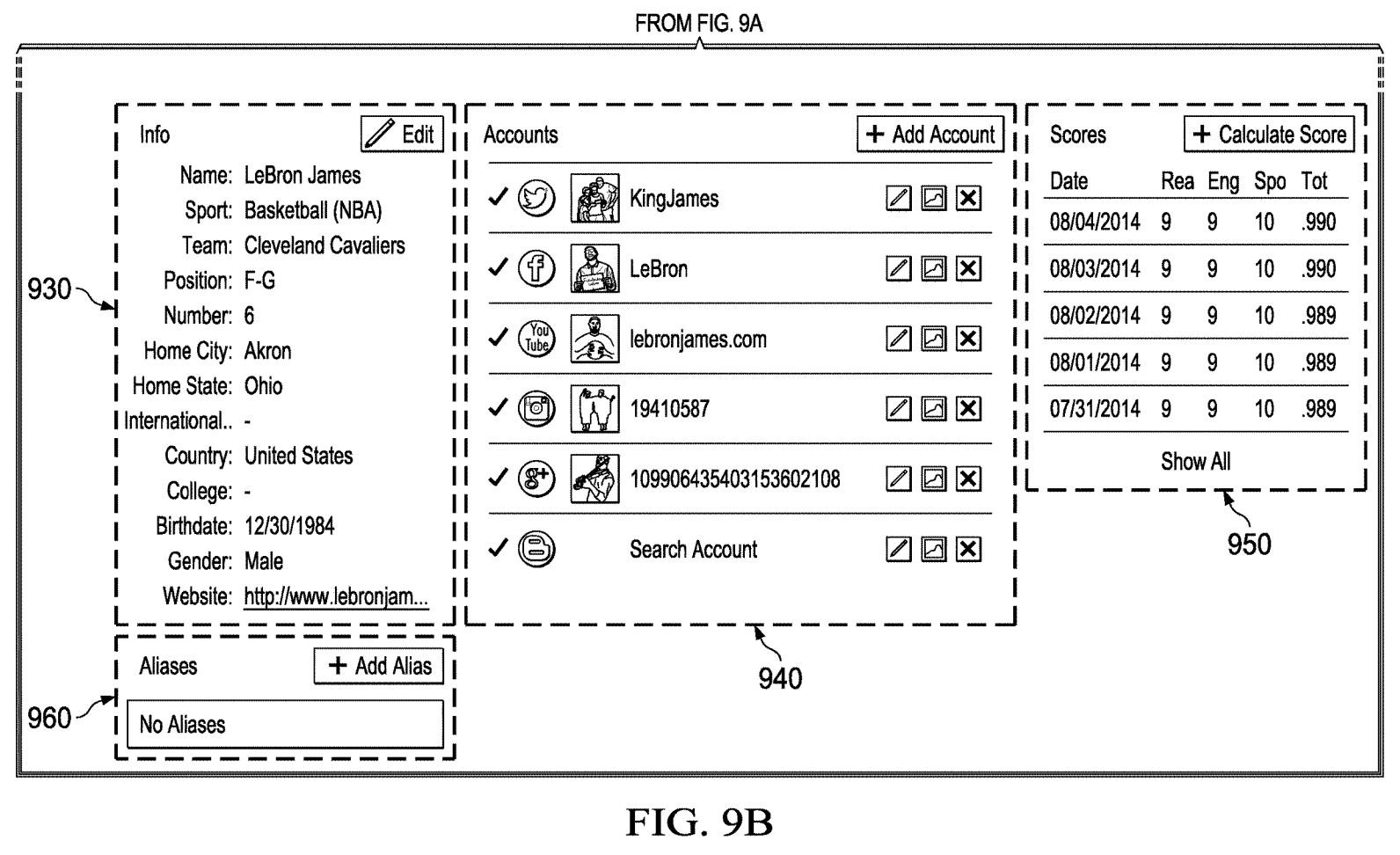

FIGS. 9A-9B are an illustration of one embodiment of an interface that may be used for player card, scoring, or database administration. Here an administrative interface 900 which allows an administrative user to provide, view or alter data on an entity. Specifically, area 910 may provide a portion of interface 900 for displaying a name associated with an entity (e.g., LeBron James) and a domain for the entity (e.g., Basketball (NBA)). Area 920 may provide a portion of interface 900 for providing or altering a biography for the entity. In one embodiment, this area 920 may allow a portion of a Wikipedia entry (or a link to that entry) to be entered here. Area 930 may allow for providing or altering information about the entity (e.g., name, domain (e.g., sport); a team or other group associated with the entity; etc.). Area 940 allows an administrative user to define accounts associated with online sites for that identify, including the account type or online site and an account identifier for the account. Here, for example, a twitter account (e.g., associated with an account type and online site twitter) has an account identifier "KingJames" while a Facebook account has an account identifier "LeBron", etc. Area 950 may display one or more historical scores determined for different facets (e.g., here Reach, Engagement and Sponsorability/Conversation) of social media exposure for that entity (e.g., LeBron James) within the domain (e.g., Basketball (NBA)) of that entity using, for example, the accounts defined in area 940. Area 960 allows an administrative user to provide or alter aliases which may be used to refer to the entity.

Figure 10:
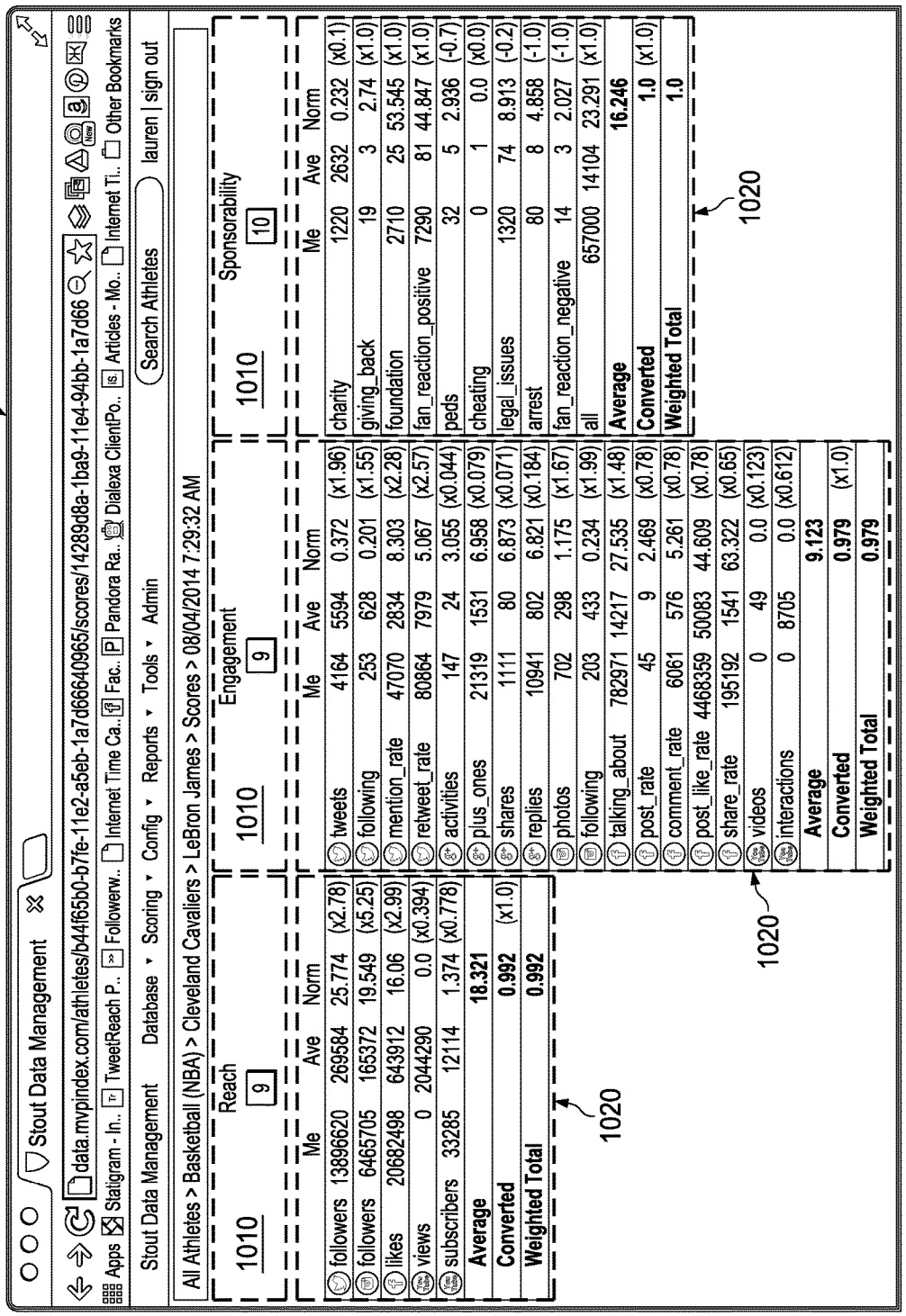
FIG. 10 is an illustration of one embodiment of an interface.
Figure 11A:
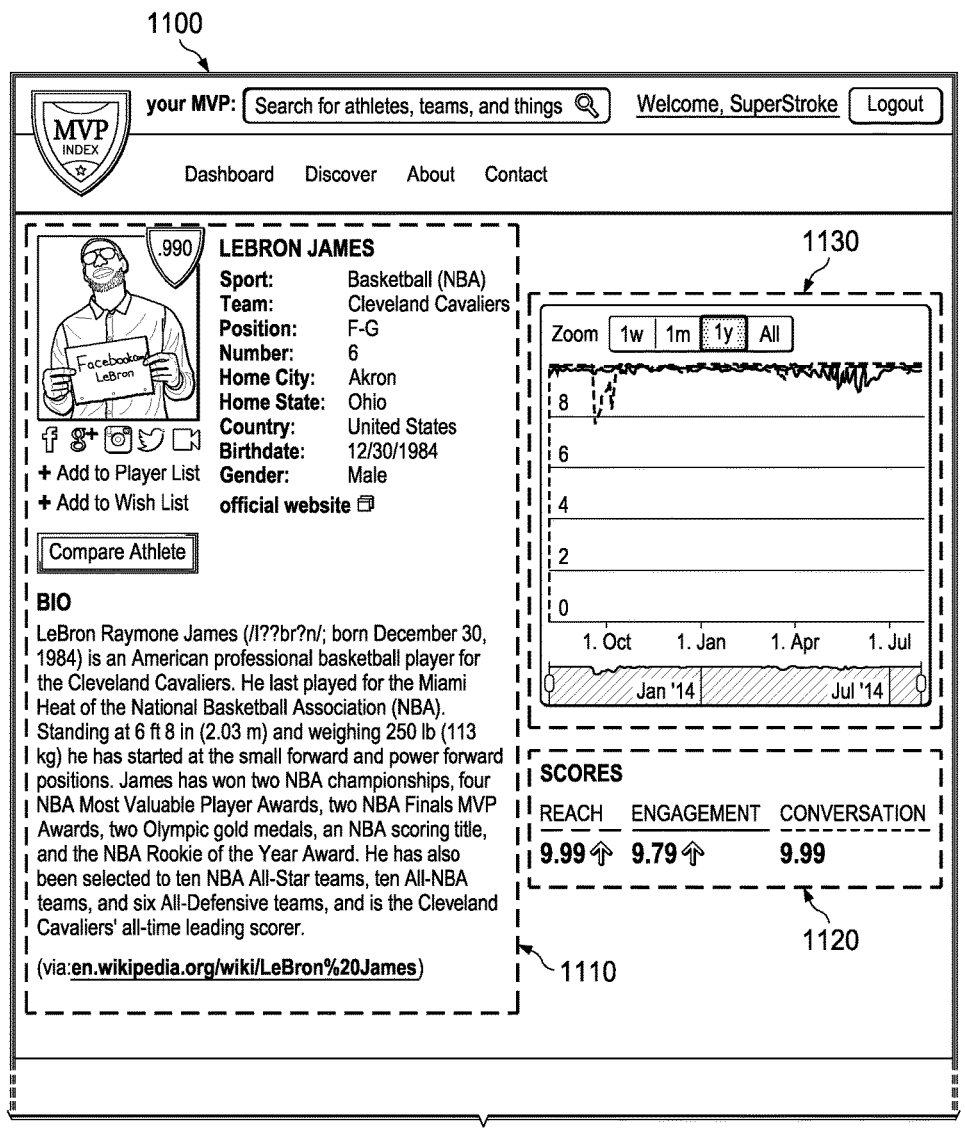
Figure 11C:
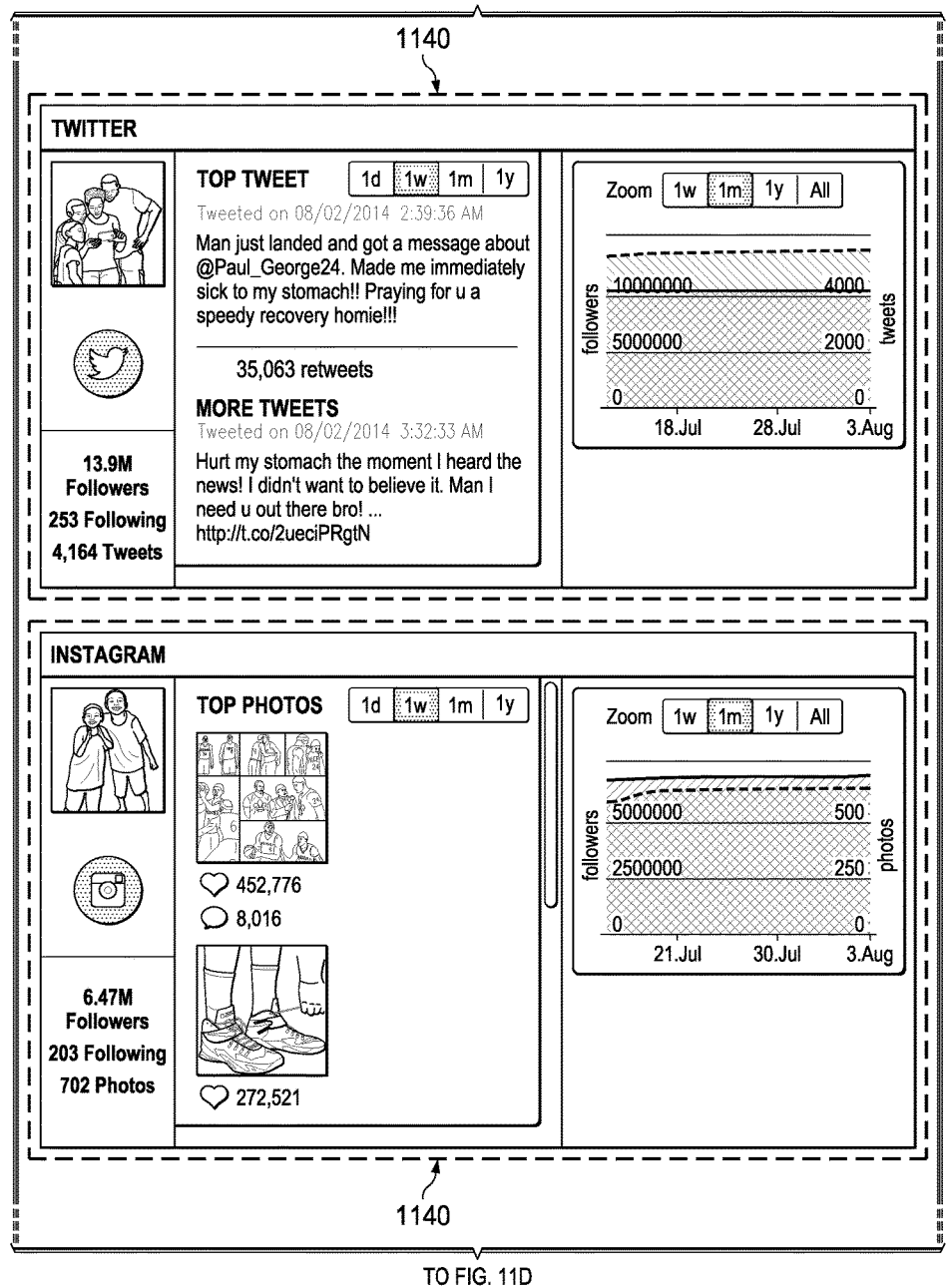
Figure 11D:
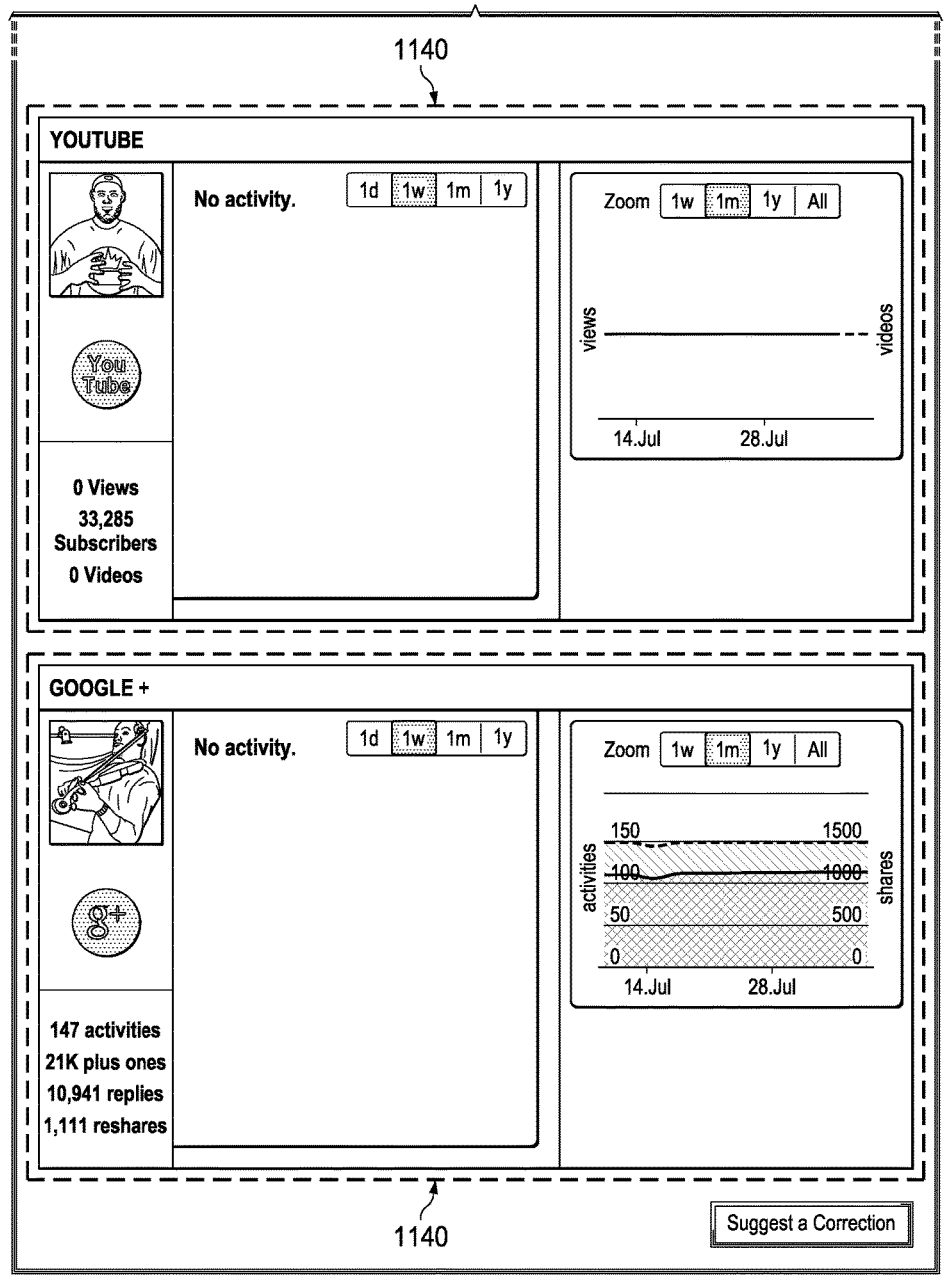

FIG. 10 is an illustration of one embodiment of an interface for player card, scoring or database administration. Here, interface 1000 may include areas 1010 that display each of the facets in which a score for that entity (e.g., here LeBron James) in the domain of that entity (e.g., here Basketball (NBA)) has been generated and the associated score for that facet. Underneath each area 1010 is a corresponding area 1020 displaying each of the data points used in calculating the corresponding score for that facet in that domain.

For example here, for the facet of Reach, data points may be for the online site twitter a number of followers; for Instagram the number of followers, for Facebook the number of likes and for YouTube the number of videos and subscribers. For the facet of Engagement, data points may be for the online site twitter a number of tweets, the number following, the mention rate and the retweet rate; for Instagram the number of photos and the number following, for Google+ the activities, plus ones, shares and replies; for Facebook the talking about number, the post rate, the comment rate, the post like rate and the share rate and for YouTube the number of videos and interactions. For the facet of Sponsorability (i.e., Conversation) the data points may be associated with the conversation categories of cheating, arrest, negative fan reaction, legal issues, performance enhancing drugs, charity, giving back, positive fan reaction and foundation.

Each of the data point may have a numerical value associated with the entity (e.g., obtained from the most recent snapshot of that account for that entity), the average for that data point within the domain of the entity (e.g., Basketball (NBA)), the normalized value for that data point and the weight to be applied to that normalized data point in calculating the score for that facet for that domain. Here, for example, for data point of tweets for the facet of engagement, LeBron James may have a value of 4164, the average value for entity's associated with the domain of Basketball (NBA) may be 5594. Thus, the normalized value for LeBron James for this data point may be 0.372 and the weight that will be applied to this normalized value when calculating the Engagement score for LeBron James will be 1.96 as he is a member of the Basketball (NBA) domain.

FIGS. 11A-11D are an illustration of one embodiment of an interface for a player card or player card report that may be requested, displayed to, and interacted with by a user. This interface 1100 includes an area 1110 for displaying information on the entity, such as the domain, group (e.g., team), the biography, etc. This data displayed may, for example, be the data entered on the entity with respect to FIGS. 9A-9B. Area 1120 may display the current scores for the entity for one or more facets of social media exposure while area 1130 may display a graphical depiction of these scores over a user adjustable time window. Additionally, the interface 100 may include one or more areas 1140 associated with an account of the entity. For example, there may be an area 1140 corresponding to each account defined for the entity by the administrator with respect to FIGS. 9A-9B. Each area 1140 may display values for data points associated with that account for that entity at the online site. For example, area 1140a may be associated with a Facebook account for the entity LeBron James (e.g., associated with the account identifier LeBron). This area 1140a may display values for data points of that account (e.g., 20.7 million Likes, 783,000 talking about, 45 post on wall rate, etc.). Additionally, the area 1140a may display actual social media content associated with this account (e.g., generated by the entity) such as, in this, case the "Top Post" within a user adjustable time window, along with values for data points associated specifically with this piece of social media content (e.g., 157,616 likes, 3,979 shares, etc.). Area 1140 may also provide the ability for a user to request more social media content associated with that account, or graphically view value for data points associated with that account. It will be noted that each area 1140 and the abilities or interfaces presented therein may be specifically tailored to the type of account and the social media content or data points available in association with that account or account type.

Figure 12A:
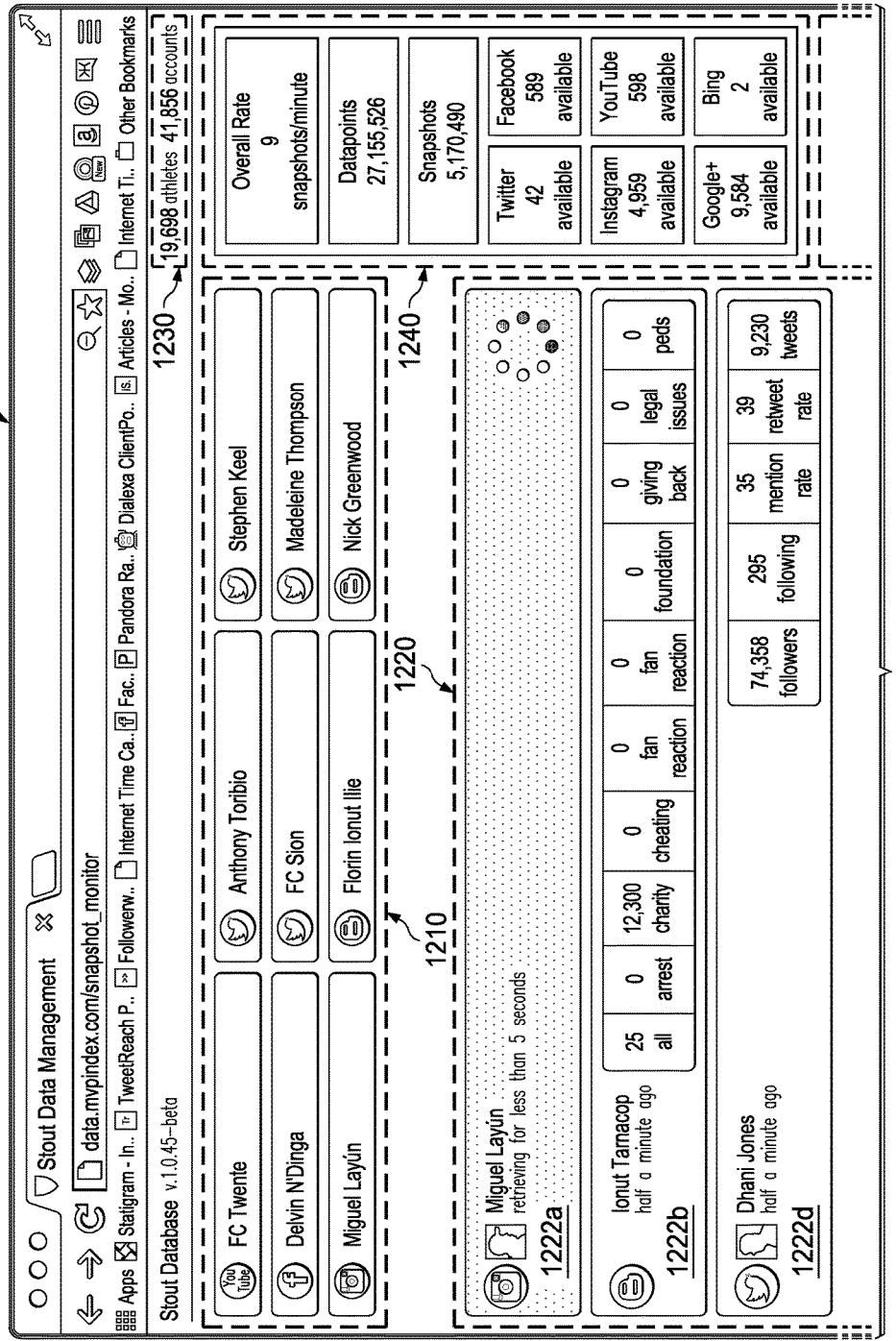

FIGS. 12A-12C are an illustration of one embodiment of an interface that may be used with management or monitoring of an update process of a social media analytics platform. Specifically, interface 1200 may include area 1230 which shows the current number of entities (e.g., 19,698 athletes in this example) that have been configured for the social media analytics platform and the number of accounts that have been configured in association with these entities (e.g., here 41,856). Area 1210 displays representation of accounts (e.g., an account of an entity associated with an account type and account identifier or a search provider account for an entity) that have been selected and queued for updating, but have not yet completed updating. Here, for example, a Facebook account for Delvin N'Dinga has been selected and queued for updating along with a twitter account for Stephen Keel; and a Bing account for Nick Greenwood, etc. Area 1220 display representations 1222 of the status or data associated with, or obtained in response to, a request to a particular online site associated with a particular account for an entity. For example, here, representation 1222a represents that the Instagram account for Miguel Layun is being updated, that a request has been sent to the online site (Instagram) to obtain data on this account, that a response has not been received and that the request was sent out 5 seconds ago. Representation 1222b represents that the Bing account for Ionut Tarnacop has been updated, that a request has been sent to the online site (Bing) to obtain data on this account (e.g., to perform searches for the entity for the terms in each conversation category), that a response was received less than 20 seconds ago and the data points received in response to the request (e.g., there 25 hits for the all categories, there were 0 hits for the arrest category, there were 12,300 hits for the charity category, etc.). Representation 1222c represents that the Facebook account for ADO Den Haag has been updated, that a request has been sent to the online site (Facebook) to obtain data on this account, that a response was received less than 1 minute ago and the data points received in response to the request (e.g., there is a value of 680 for the comments data point, 18,907 for the likes data point, a value of 1,941 for the talking about data point, etc.). Representation 1222d represents that the twitter account for Dhani Jones has been updated, that a request has been sent to the online site (twitter) to obtain data on this account, that a response was received less than half a minute ago and the data points received in response to the request (e.g., there is a value of 74,358 for the followers data point, 295 for the following data point, a value of 9,230 for the tweets data point, etc.).

Area 1240 may present data on the update process overall, including the overall rate of snapshots (e.g., response from online sites) per minute; how many data point values have been obtained, how many snapshots have been obtained and the number of requests available for each online site in a particular time period given the rate limits imposed by that site and the requests that have been sent by any update processes operating. Area 1250 may present data on errors associated with requests for various accounts, including the entity and account type (e.g., Eric Hassll and twitter). By clicking on a representation 1252 of an error an administrator may be able to obtain further information on this error and take action with respect to the error.

It will now be helpful to discuss in more detail embodiments of certain interfaces that may be used with embodiments of a social media analytic platform. The first group of interfaces may include web based interfaces that may be provided by a client application to users of the social media analytics platform. Some features of these interfaces can be limited to specific account levels or type. Though examples and embodiments have been discussed specifically with reference to an athlete it should be understood that such interfaces are generally applicable to all types of entities. The second group of embodiments of interfaces described may include administrative interfaces for use by administrators of embodiments of social media analytics platform.

I. User Interfaces

Root Screen

This can be the page that all users can land on when visiting the root domain of the client application module. In addition to static marketing copy and a prominent search input, this page displays several areas of dynamic content.

Ticker

A rolling display of entities whose scores for facets have changed the most in the past block of time. The length of this block of time may change based on the rate-limiting and other factors associated with the data sources, but it can start in the range of an hour. The names of entities mentioned in the ticker can be clickable links that can bring the user to that entity's player card. The contents of this may or and may not update while the page is displayed.

Match Up

This can contain a curated pair of entities are relevant to the timeframe. The visual can include pictures or avatars of the two entities and their Index Ranks/Scores, a caption heading, and a caption. Clicking on the visual can bring the user to the Player Comparison card for those two entities.

Top Social Content

This can contain a dynamic single set of social media content. This may include, but is not limited to:

Most popular Twitter tweet originating from an entity.
Most popular Facebook post originating from an entity.
Most popular Google+ post originating from an entity.
Most popular Instagram photo originating from an entity.
Most popular YouTube video originating from an entity.

Top 10

This can contain the top 10 (or other number) entities by an index score (such as an overall index score). There can be an interactive element to allow the user to select "Overall" or to filter for example, athletes in a given sport.

Player Card

A client application module can interact with a score service to retrieve score information and provide a web page, app page or information for other interfaces incorporating the information. According to one embodiment, the client application module can return a "Player Card." The "Player Card" provides, in one embodiment, a single aggregated collection of all social media data for a single entity (e.g., athlete). According to one embodiment, data shown on the Player Card is rendered in three formats. The first is a simple display of the raw data: a single number for a given statistic. These data always show the last value of the data point for that athlete.

Secondly, a graph is rendered for time-series data that allows the user to see collected data from social media sites over an adjustable period of time. This graph also allows for the direct comparison of different data points over the same time period.

Finally, individual activities of the athlete on a given social media source are shown with associated metadata, media, and statistics. Each provides direct access to the user to access those activities on the original source website. For example, Facebook activity statistics for and athlete can link the athlete's Facebook page.

In some embodiments, the Player card is the primary screen for information about a single entity (e.g., athlete). This page can contain several sections. There are a set of components common to all athletes that are not dependent on any 3rd-party social media content. These are listed below and, according to one embodiment, appear on all Player Cards.

Avatar Image

This is a static image of the entity. The may be image can be set using the Player Card Management Screen functionality described below. Avatar images can be set up by Administrators only.

Biographical Statistics

These statistics can be populated by the data entered in the Player Card Management Screen. These can include, but are not limited to:

Sponsor list
Hometown City
Hometown State
College
Birthdate
Gender
Team (can be a link to the team page)
Sport
Website (can be a link to the athlete's website)

Any of these fields that are not known or are not applicable (such as "Team" for golf or tennis players) can be omitted. A user can request a correction to biographical statistic and the biography on this player card through a simple form.

Biography

This can be a block of text as described in the Player Card Management Screen below.

Links to Social Media

These can be direct links to the entity's social media accounts as set up.

Top Competitors

The three top (or other number) of entity's in this Athlete's sport as ranked by combined Index Score can be shown under Top Competitors. The user can click on one of the avatar images to go to that athlete's Player Card.

Current MVP Index

Depending on the level of the user's account, they can either have access to Numeric Index Scores or Ranks and Trend Arrows. For users with access to Numeric Index Scores for this athlete, the Combined Index Score can be displayed between the range of "0.000" to "0.999". Additionally, the scores for each of Reach, Engagement, and Sponsorability can be shown on a scale of "0" to "9" along with the trending arrows for each (up, down, or equal).

For users that do not have access to this Athlete's Numeric Index Scores, in place of the combined Index Score, the user can see a ranking of that athlete compared to all other athletes configured in the system. This ranking can be shown as an exact number (i.e., 3rd, 127th, etc.) for all athletes in the top 200 (or other number of) positions. In some embodiments, for athletes not in the top group, a percentile can be shown as to where that athlete falls in the list of all athletes. These percentiles can be defined as "Top 10%", "Top 20%", "Top 30%", "Top 50%", "Bottom 50%", "Bottom 30%", "Bottom 20%", and "Bottom 10%" or otherwise.

Historical MVP Index

For users with access to this Athlete's scores, a graph showing each of Reach, Engagement, and Conversation can be shown. There can be options for the time scale, such as, for example: Week (rolling 7 days), Month (rolling 30 days), and Year (rolling 52 weeks). If a user does not have access to this Athlete's Numeric Index Scores, "teaser" other content can be shown.

The sections that describe specific social media statistics or content may only be shown on athletes that have those accounts. For instance, if an athlete has only a Facebook and Instagram account listed in the Athlete Database, a Twitter details section is not shown (either omitted or other content placed in that area of the web page). Example social media information can include, but is not limited to:

Facebook
  Profile Picture
  Number of page likes
  Number talking about
  Number of page wall posts
  Most recent wall post with number of likes and comments for that post
  Male/female breakdown of people that liked all wall posts
  Country breakdown of people that liked all wall posts Twitter
  Profile Picture
  Number of followers
  Number following
  Number of tweets
  Most recent Tweet from the athlete
  Most popular recent Tweet mentioning the athlete
  Time series graph of follower and tweet count—cumulative vs. timespan Instagram
  Profile Picture
  Number of followers
  Number following
  Number of photos
  3 Most recent images from the athlete with number of likes and comments
  Time series graph of follower and photo count—cumulative vs. timespan Google Plus
  Profile Picture
  Number of public activities this athlete has posted
  Number of plus ones for this athlete's public activities
  Number of reshares of this athlete's public activities
  Number of replies to this athlete's public activities You Tube
  Profile Picture
  Number of views
  Number of subscribers
  Number of videos
  Most popular video with number of likes, dislikes, and favorites
  Time series graph of views and videos—cumulative vs. timespan Information from other social media services can be provided as needed or desired.

Player Card Report

This report is accessible from a Player Card. It holds the same information as the Player Card with the addition of detailed historical data and the collected Social Media activity for that Athlete. Upon selecting this report, the user can be asked to select the time range from, for example, either a rolling 30-day window, a rolling 90-day window, any month that has already elapsed, any quarter that has already elapsed or other time period. According to one embodiment, the following can be shown in a time-series graph.

Combined Index Score
  Reach, Engagement, and Sponsorability Index Score
  Daily or weekly Number of Tweets
  Total Twitter Followers
  Daily or weekly change in Total Twitter Followers
  Total Twitter accounts Followed
  Daily or weekly change in Total Twitter accounts Followed
  Mention Rate
  Retweet Rate
  Total Facebook Likes
  Daily or weekly change in Total Facebook Likes
  Daily or weekly Facebook Talking About Count
  Daily or weekly Number of Facebook Posts
  Daily or weekly Number of Shares of Facebook Posts
  Daily or weekly Number of Likes of Facebook Posts
  Number of Instagram Followers
  Daily or weekly change in Instagram Followers
  Number of Instagram Friends
  Daily or weekly change in Instagram Friends
  Number of Instagram Photos
  Daily or weekly count of new Photos posted
  Total number of Google+ Activities
  Daily or weekly count of new Google+ Activities
  Total number of Plus Ones of Google+ Activities
  Daily or weekly count of new Plus Ones of Google+ Activities
  Total number of Replies to Google+ Activities
  Daily or weekly count of Replies to Google+ Activities
  Total number of Shares of Google+ Activities
  Daily or weekly count of Replies of Google+ Activities
  Total number of YouTube Videos
  Daily or weekly count of new YouTube Videos
  Total number of Views of YouTube Videos
  Daily or weekly count of Views of YouTube Videos Total number of YouTube Subscribers
Daily or weekly change in YouTube Subscribers
Total number of YouTube Interactions
Daily or weekly change in YouTube Interactions Each of the following Social Media Activities can be shown as part of this report (assuming that the Athlete has a presence on each of these sources). The time period selected above may not be applicable depending on the source.

Facebook Wall Posts sorted by most likes
Twitter Tweets sorted by most retweets
Google Plus Activities sorted by most "Plus-One's"
Instagram Photos sorted by most likes
YouTube Videos sorted by most views Social Content Querying In some cases, the client application module may be configured to allow an user to submit search terms as part of a request. According to one embodiment, the client application module can interact with a query service module to run a query on a database. The results returned can include the pieces of social media content responsive to the queries, information about the social content that contained the queries, metrics run on the results of the queries or other information.

For example, the web page provided by the client application module may allow a user to enter free text searches or searches limited to certain criteria (say information relating to specific brands, entities, etc.) If the user enters a search for "Brand x", the client application module can forward a request to the query service, which can interact with the database to run a query. The result of the query may include all the social content (tweets, Facebook posts, etc.) that references Brand X, the entity responsible for the content, etc. The query service can return this information to the client application module or may run an analysis of the results (e.g., determine the top five people referencing Brand X in the social content, etc.) and return the results to the client application module.

In some embodiments, a client may wish to limited queries to only certain entities. For example, a query may be run to determine how many times entity 1 (say an athlete) mentioned Brand X (e.g., the athlete's sponsor) in social content (or specific types of social content (tweets, posts, etc.)).

Keywords of interest can be established for the client so that the database can be continually queried (or queried according to a schedule or other criteria) for the references to the information of interest. Thus, for example, a user may establish a monitoring rule to monitor for references to "Brand x" by all entities, references to "Brand y" by a specific entity (e.g., athlete) or otherwise. The monitoring rules may be arbitrarily complex.

Querying the database and processing the results to derive metrics can be the responsibility of the client application module or a query service module.

The search results can be displayed on the Search Results screen. All results can be filterable by for example, sport and/or location. Only one option in each of sport or location can be selected, and there can be an "All" option. The options in the sport category can be sports for the players found in the results. For example if a football team, two baseball teams, and 5 tennis players are returned as part of the results, the only options for sports to filter by can be football, baseball, and tennis. Location filtering options can be states or other locations for those players that have a state listed and country for those who do not. If more than one country is represented by the results, a country option can be added to filter for players by country and state/province or other region. Location filtering options can be treated similarly to the Sport filtering options in that only options relevant to the search results can be shown.

According to one embodiment, if any teams match the search term, they can be listed first, in order of relevance with ties being broken by the Combined Index Score. Each team search result can contain the name of the team, the team logo (if available), the city and/or state for the team, and avatars for the top 5 (or other number) players on that team sorted by Combined Index Score.

Following the team results (if there are any), matching players can be listed sorted by relevance with ties broken by the combined Index Score. For each search result, the athlete's avatar, name, sport, and team (if applicable) can be shown. The user can be able to sort the results by relevance or name. If no results are found for the search, the user can be told so and can be directed to modify the search query.

Player Comparison

From a Player Card, a user is able to click on a link that takes them to the player comparison page. On entry, this page has the athlete from the original Player card on the left with an input on the right where the user can type a player's name to compare against. The player search box can use a type-ahead input that searches. The user can click on a name that comes up in the type-ahead suggestions to select that athlete. Once an athlete is selected, the athlete is shown, lined up with the player to be compared against. The player search box can remain visible above the selected athlete and can continue to function as described. At any time, the user can click on the name of either athlete to go to that athlete's player card.

For each player shown, the athlete's avatar image, name, and biographical statistics can be shown. Additionally, the combined Index Score or Rank can be shown along with the Index Score or trend arrows for each of Reach, Engagement, and Sponsorability and other information Team Card The Team Card shows information related to the athletes associated with an individual team. The Team Card, in one embodiment, contains the following sections:

Team Logo Image
Team Numeric Scores or trending arrows for each of Reach, Engagement, and Conversation averaged across each of the Team's Athletes
Time-series graph of each of Reach, Engagement, and Conversation averaged across each of the Team's Athletes (if the user has access to Numeric Team Index Scores) with options for choice of scale: Week (rolling 7 days), Month (rolling 30 days), and Year (rolling 52 weeks). If a user does not have access to this Team's Numeric Index Scores, "teaser" marketing copy or other content can replace this graph.
Social Media content aggregated across all Athletes on the Team
List of all Athletes on the Team sorted by Combined Index Score (Top 10, expandable to view all)
List of Top Competitors: the top three teams in the same sport as sorted by Combined Index Score Account Dashboard A dashboard can be provided to allow an overview of the social portfolio of that account. Additionally, the user can set up a "Wish List" of athletes that they may or may not have a relationship with.

Account Image

The user can have an option to upload an image that can be placed in this area.

Account Index Scores

For accounts other than the Basic level, once the user has set up at least one Custom Social Media account, the Reach and Engagement scores can be shown along with the trending arrows.

Historical Account Index Scores

Once the user has set up at least one Custom Social Media account, and the Social Media Analytics System has gathered at least three Reach and Engagements Scores, the historical values of these scores can be shown in a time-series line graph. If the user has not set up any Custom Social Media accounts, a message can be displayed over the graph area stating this. If the user has set up at least one Custom Social Medial account, but there have not been enough scores calculated, a message stating this can be shown to the user.

Top Sponsored Athletes

The avatar images of the top number (e.g., 6) athletes that the account has marked can be shown. Clicking on an athlete's image can bring the user to that athlete's player card. A button can be provided that allows the user to see all of the athletes on that account's player list. Each of Reach, Engagement, and Conversation can be averaged among all players on the list. Additionally, a trend arrow for that score can be shown (up, down, or equal) to represent the most recent direction of motion for that score.

If there are not athletes in the Player List, copy can be shown to the user describing how to add players to the Player List.

The user can click on a button marked "Summary Report" that generates in a new window a Player Summary Report for that account's Player List.

Top Watched Athletes

The avatar images of the top number (e.g., 6) athletes that the user has placed on its Wish List can be shown. Clicking on an athlete's image can bring the user to that athlete's Player Card. A button can be provided that allows the user to see all of the athletes on that account's Wish List. Each of Reach, Engagement, and Sponsorability can be averaged among all players on the list. Additionally, a trend arrow for that score can be shown (up, down, or equal) to represent the most recent direction of motion for that average score.

If there are no athletes in the Wish List, copy can be shown to the user describing how to add players to the Wish List.

The user can click on a button marked "Summary Report" that generates in a new window a Player Summary Report for that account's Wish List.

Account Social Media Content

If the user has set up any twitter, Facebook, or Instagram Custom Social Media accounts, an Account Social Media Content section can be present below the Player List. If the user has not set up any accounts, this section can contain copy that instructs the user on how to add a Custom Social Media account.

If the user has a twitter account, the top three most popular tweets authored by the Account can be shown along with the number of retweets and favorites for each. If the user has a Facebook Page, the three most recent wall posts and the share, like, and comment counts for each. If the user has an Instagram account, the three most recent pictures can be shown along with the number of likes and comments for each image.

Player Social Media Content

If the user has at least one athlete on their Player List, the content of the social media accounts for all athletes listed can be aggregated. If at least one athlete has a Twitter account, the top three most popular tweets authored by any of the athletes on the Player List can be shown along with the number of retweets and favorites for each. If at least one athlete has a Twitter account, the three most recent wall posts across all athletes on the Player List and the share, like, and comment counts for each. If at least one athlete has an Instagram account, the three most recent pictures for all athletes on the Player List can be shown along with the number of likes and comments for each image.

Historical Player Index Scores

If the Social Media Analytics System has gathered at least three (or some other number) Reach, Engagement, and Conversation scores for at least one athlete on the Player List, the historical values of the average scores across all athletes on the Player List can be shown in a time-series line graph. If the user does not have any athletes on their Player List, the graph can be replaced with copy instructing the user to add athletes to the Player List.

Top Teams (for Team Accounts Only)

For Team accounts, the top 10 (or other number) teams in the same sport as the account can be shown ranked by combined Index Score. Clicking on one of these Teams can bring the user to that team's Team Card. Clicking to "see all" can bring the user to the Advanced Filtering page with "Teams" selected filtered by sport.

II. Administrative Interfaces

The MVP Index Web Application can allow authorized administrators to manage the functionality of the MVP Index Web Application. This includes account management, content management, and other functionality.

Player Card Administration

The administrator can add and remove athletes from the system. For each athlete, the administrator can modify the biographical information including, but not limited to the fields below:

First Name
Last Name
Photo
Biography
Sponsor list
Hometown City
Hometown State
College
Birthdate
Gender
Team
Sport
Website Administrative Options The administrator can be able to set administrative options that can have an effect on the entire application. According to one embodiment, only Administrators with a sufficient level of access (e.g., flagged as "Owner") are able to modify these options. According to one embodiment, administrative options include:

Approval requirement for each Account Level
Maximum number of Player Slots for Basic and Premium Account Levels
Base Subscription Prices for each Account Level
Additional Subscription Price for each Player Slot at each Account Level
Default sport for the Top 10 displayed on the Root Screen
Other options needed as development proceeds Administrative Account Management A system administrator with a sufficient level of access can be able to add, remove, or modify other Administrative accounts. For each of these administrators, he or she can be able to flag the administrator as an "Owner" or as having another level of access.

Database Management

An athlete database management application can be configured to allow authorized users to view and manage the athletes through interaction of the database management application with the database service application. According to one embodiment, the authorized user can be able to perform various actions including, but not limited to:

- List, add, delete, and modify entities (athletes, brands, teams, and agents)
- List, add, delete, and modify sports
- View, modify, or set the sport for each entity
- List, add, delete, and modify social accounts for each entity
- Verify the data points gathered for each social account for each entity
- List, add, delete, and modify aliases for each entity Some social media APIs provide links to other social media accounts. The management application can give the user the option of "auto-discovering" other social media handles for a given athlete based on these links. These links, in some embodiments, are a best-effort guess by the application and can require user-intervention to be properly configured, but can be helpful in providing hints to the user when setting up an athlete's social media accounts.

Scoring Management

Various aspects of the scoring system discussed above involve manually-tuned weights and parameters. In order to accomplish this, a web interface can be provided that gives access to authorized person to modify the "knobs and switches" of the algorithm. For example, according to one embodiment, a user (e.g., an administrator) can be shown an interface having a series of graphical dials that the administrator can "turn" (e.g., using a touch screen, mouse or other input device) to tune the weights.

For each sport (including "brands", "teams", and "agents") (or other segment) the scoring management application can provide an interface with all of the data points listed, where the interface allows a user to set the relative weights for each of the data points for that segment. According to one embodiment, only the relative values within this sport impact the final Index Score for an athlete as that score has already been normalized for a particular sport. The sports (or other segments) available for tuning can be determined by those set up in the Athlete Database Service (see above).

Second, an interface can be provided where the user can disable any of the data points. A data point that is disabled can still be collected and stored, but is not used in the calculation of Index Score (effectively the same as setting the weight of that data point to zero).

Finally, an interface can be provided in which the user can manage the Conversation categories. Here, a user could add remove or modify a S Conversation Category. Each Conversation category has a name, a weight, and a "positive" or "negative" flag. Within each Conversation category, a user can be able to manage a list of terms that can be searched for in relation to an athlete to determine the data point value for that Conversation category.

Match Up Administration

The administrator can set up "Match Ups" for display on the Root Screen (see above). The administrator can see a list of all the scheduled Match Ups and can be able to add, modify, or delete them. Each Match Up can have the following fields:

Start Date
Athlete 1 (can be shown on the left of the bout)
Athlete 2 (can be shown on the right of the bout)
Bout Title
Bout Content So that there is always content to display, the Root Screen can show the bout with the most recent start date in the past. For example, if there is a bout with a start date of May 3rd, one with May 15th, and one with May 25th, then on May 18th, the bout starting on May 15th can be shown. If the bout starting on May 15th is deleted, the one starting on May 3rd can be shown. If there is no bout in the past, the system can show the closest bout in the future. If there is only one bout listed in the system, the user can not be allowed to delete it.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary, Description or Exhibits is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract, Summary or Exhibits.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Different programming techniques can be employed such as procedural or object oriented. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments.

It is also within the spirit and scope of the invention to implement in software programming or of the steps, operations, methods, routines or portions thereof described herein, where such software programming or code can be stored in a computer-readable medium and can be operated on by a processor. The invention may be implemented by using software programming or code, by using application specific integrated circuits, programmable logic devices, field programmable gate arrays, optical, chemical, biological, quantum or nanoengineered systems, components and mechanisms may be used. Distributed or networked systems, components and circuits can be used. In another example, communication or transfer (or otherwise moving from one place to another) of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

APPENDIX A

Facebook
  Profile Picture
  Number of page likes
  Number talking about
  Number of page wall posts
  Most recent wall post with number of likes and comments for that post
  Male/female breakdown of people that liked all wall posts
  Country breakdown of people that liked all wall posts
Twitter
  Profile Picture
  Number of followers
  Number following
  Number of tweets
  Most recent Tweet from the athlete
  Most popular recent Tweet mentioning the athlete
  Time series graph of follower and tweet count—cumulative vs. timespan
Instagram
  Profile Picture
  Number of followers
  Number following
  Number of photos
  3 Most recent images from the athlete with number of likes and comments
  Time series graph of follower and photo count—cumulative vs. timespan
Google Plus
  Profile Picture
  Number of public activities this athlete has posted
  Number of plus ones for this athlete's public activities
  Number of reshares of this athlete's public activities
  Number of replies to this athlete's public activities
You Tube
  Profile Picture
  Number of views
  Number of subscribers
  Number of videos
  Most popular video with number of likes, dislikes, and favorites
  Time series graph of views and videos—cumulative vs. timespan

APPENDIX B

| | | | |
|---|---|---|---|
| Twitter | twitter:tweets | number of tweets by this entity | Engagement |
| | twitter:mention_rate | number of mentions of this entity's handle by others | Engagement |
| | twitter:reply_rate | number of replies to tweets this athlete authored | Engagement |
| | twitter:followers | number of followers this entity has | Reach |
| | twitter:following | number of users this entity is following | Engagement |
| Facebook | facebook:likes | number of likes for this entity's page | Reach |

APPENDIX B-continued

| | | | |
|---|---|---|---|
| | facebook:talking_about | talking about count for entity's page | Engagement |
| | facebook:posts | number of wall posts on the entity's page | Engagement |
| | facebook:comments | number of comments left on all wall posts on this page | Engagement |
| | facebook:post_likes | number of likes for all wall posts on this page | Engagement |
| | facebook:shares | number of shares for all wall posts on this page | Engagement |
| YouTube | youtube:videos | number of videos this entity has uploaded | Engagement |
| | youtube:views | number of views for this entity's uploaded videos | Reach |
| | youtube:subscribers | number of subscriber's to this entity's channels | Reach |
| | youtube:interactions | number of likes, dislikes, and shares for all videos | Engagement |
| Instagram | instagram:photos | number of photos the entity has uploaded | Engagement |
| | instagram:followers | number of followers this entity has | Reach |
| | instagram:following | number of Instagram users this entity is following | Engagement |
| Google+ | google_plus:activities | number of activities by this entity | Engagement |
| | google_plus:plus_ones | number of "+1"s for this entity's activities | Engagement |
| | google_plus:shares | number of shares of this entity's activities | Engagement |
| | google_plus:replies | number of replies to this entity's activities | Engagement |

What is claimed is:

1. A system, comprising:

a social media analytics platform coupled to each of one of more online sites over a network, wherein the one or more online sites include at least one social media site, each of the one of more online sites is associated with rate limiting data defining a number of requests and a time period for that online site, and each online site provides a corresponding interface for requesting data from that online site, the social media analytics platform configured with a plurality of entities, each entity associated with a domain of a plurality of domains and having an account at each of the online sites, and the social media analytics platform is further configured so each online site is associated with a plurality of data points wherein the social media analytics platform further comprises:

a data store; and a set of computer devices, each computer device including a processor, the set of computer devices implementing:

an update process module including a set of asynchronously operating update processes operating simultaneously to update the data store with values for the plurality of data points for the plurality of entities while accounting for the rate limiting data for the one or more online sites by:

determining a plurality of accounts to update, where each account is associated with one of the plurality of entities and one of the online sites by:

determining at least one online site for which a rate limit has not been reached based on the rate limiting data associated with each online site, wherein the determination of the at least one online site comprises determining any online sites for which a rate limit has not been reached and any online sites for which a rate limit has been reached by:

for each of the online sites, accessing the rate limiting data associated with each online site, obtaining a plurality of snapshots of historical data obtained from that online site in the data store, evaluating timestamps associated with the plurality of snapshots from that online site to determine if the number of requests defined by the rate limiting data for that online site exceeds a number of the plurality of snapshots from that online site during a previous time period equal to the time period defined by the rate limiting data for that online site; and identifying that online site as one of the at least one online sites for which a rate limit has not been reached if the number of requests defined by the rate limiting data exceeds the number of snapshots from that online site during the previous time period, and identifying that online site as an online sites for which a rate limit has been reached if the number of snapshots from that online site exceeds the number of requests defined by the rate limiting data during the previous time period, and identifying a number of accounts sites that were least recently updated associated with each of the determined at least on online sites for which a rate limit has not been reached including excluding each of the online sites for which the rate limit has been reached and any associated accounts from the number of accounts that were least recently updated; and from all the accounts associated with all the determined at least on online sites for which a rate limit has not been reached, determining a final number of accounts that were least recently updated and selecting the plurality of accounts to update from the final number of accounts; and for each account of the selected plurality of accounts to update associated with the determined online sites for which a rate limit has not been reached:

forming a request for the plurality of data points associated with the online site associated with that account, wherein the request conforms to the corresponding interface provided by that online site and requests values for the plurality of data points associated with the online site for the entity associated with that account;

sending the request to the online site associated with the account over the network;

receiving a response to the request, where the response includes a value returned by the associated online site for each of the plurality of data points associated with the online site associated with the account; and storing the value for each of the plurality of data points received from the online site in the data store in association with the entity and the account;

a scoring module operable to determine scores for facets of social media exposure for the plurality of entities based on the values for the plurality of data points for the plurality of entities by:

accessing the data store to determine the value for each of a first set of the plurality of data points for the entity, wherein the first set of data points are associated with a first facet of social media exposure;

determining a first score for the entity for the first facet of social media exposure utilizing a weight for each of the first set of data points, wherein the weight is specific to the domain associated with the entity;

accessing the data store to determine the value for each of a second set of data points of the plurality of data points for the entity, wherein the second set of data points are associated with a second facet of social media exposure;

determining a second score for the entity for the second facet of social media exposure utilizing a weight for each of the second set of data points, wherein the weight is specific to the domain associated with the entity; and an interface module operable to generate interfaces for presentation of scores for facets of social media exposure for the plurality of entities by:

presenting the first score for the entity and the second score for the entity in association with that entity in a first interface accessed over the network.

2. The system of claim 1, wherein the data store comprises a caching layer and the scoring module operates on a periodic basis to generate the first score and the second score and store the first score and the second score in association with the entity in the caching layer, and wherein the first score and the second score for the entity are obtained from cache by the interface module when presenting the first interface.

3. The system of claim 1, wherein the one or more online sites include a search provider site.

4. The system of claim 3, wherein the data points of the plurality of data points that are associated with the search provider site include a plurality of conversation categories, each conversation category associated with a set of search terms.

5. The system of claim 4, wherein the update process module is operable to update the data store with values for the plurality of data points for the plurality of entities by:

determining that the online site associated with the account is the search provider site;

accessing the data store to determine the set of search terms associated with each conversation category; and accessing the data store to determine a name associated with the entity, wherein forming the request for the plurality of data points associated with the online site associated with the account, includes a request for values for each conversation category based on the search terms for the conversation category and the name of the entity.

6. The system of claim 1, wherein the scoring module is operable to determine the first score for the first facet by:

normalizing the value for each of the first set of data points;

for each data point of the first set of data points, weighting the normalized value for that data point utilizing the weight corresponding to that data point for the domain of the entity;

determining an average of the weighted normalized values; and applying a distribution function to the average.

7. The system of claim 6, wherein the distribution function is an inverse function or a sigmoid function.

8. The system of claim 1, wherein the first facet and second facet comprise one of Reach, Engagement or Conversation.

9. The system of claim 8, wherein the first facet is Conversation, the first set of data points are the conversation categories, the conversation categories include positive conversation categories and negative conversation categories and the scoring module is operable to determine the first score for the first facet by:

normalizing the value for each of the conversation categories;

for each of the positive conversation categories, weighting the normalized value for that positive conversation categories utilizing the weight corresponding to that positive conversation categories for the domain of the entity, determining a positive weighted average based on the weighted normalized values for each of the positive conversation categories, and applying a first distribution function to the positive weighted average;

for each of the negative conversation categories, weighting the normalized value for that negative conversation categories utilizing the weight corresponding to that negative conversation category for the domain of the entity, determining a negative weighted average based on the weighted normalized values for each of the negative conversation categories, and applying a second distribution function to the negative weighted average; and determining the overall conversation score for the entity by adjusting a starting score with the positive weighted average and the negative weighted average.

10. The system of claim 9, wherein the first distribution function and the second distribution function are different.

11. The system of claim 1, wherein the interface module further operable to provide a second interface to configure each weight for each of the plurality of data points for each of the plurality of domains.

12. The system of claim 1, wherein the data store includes a management module operable for determining at least one online site for which a rate limit has not been reached by:
for each of the at least one online sites:
- accessing the rate limiting data associated with the online site;
- accessing a plurality of snapshots of historical data obtained from that online site in the data store, where each snapshot is associated with a timestamp;
- determining, based on the timestamps associated with the plurality of snapshots from that online site, if the number of requests defined by the rate limiting data for that online site exceeds the number of snapshots from that online site during a previous time period equal to the time period defined by the rate limiting data; and
- identifying the online site as one of the at least one online sites for which a rate limit has not been reached if the number of requests defined by the rate limiting data exceeds the number of snapshots from that online site during the previous time period.

13. The system of claim 12, wherein the management module is operable to determine the final number of accounts by:
for each of the identified online sites for which a rate limit has not been reached, identifying a number of accounts in the data store associated with that online site that have been least recently updated; and
sorting all the accounts identified for all the online sites according to the timestamp associated with each account to determine the final number of accounts from all the accounts identified for all the online sites that were least recently updated.

14. The system of claim 13, wherein the number of accounts associated with that online site are identified by:
accessing all the accounts associated with that online site in the data store;
determining, based on the timestamps associated with the snapshots of historical data associated with accounts of that online site, the number of accounts that were least recently updated.

15. The system of claim 13, wherein the plurality of accounts are selected randomly from the final number of accounts.

16. The system of claim 15, wherein the number of the plurality of accounts to update selected is based on a number of available slots for a dispatch queue maintained by the update process module.

* * * * *